United States Patent
Arai

(10) Patent No.: US 10,146,043 B2
(45) Date of Patent: Dec. 4, 2018

(54) IMAGE PROCESSING DEVICE, IMAGE PROCESSING METHOD, MICROSCOPE SYSTEM, AND COMPUTER-READABLE RECORDING MEDIUM

(71) Applicant: OLYMPUS CORPORATION, Tokyo (JP)

(72) Inventor: Toshihiko Arai, Yamato (JP)

(73) Assignee: OLYMPUS CORPORATION, Tokyo (JP)

( * ) Notice: Subject to any disclaimer, the term of this patent is extended or adjusted under 35 U.S.C. 154(b) by 361 days.

(21) Appl. No.: 14/993,578

(22) Filed: Jan. 12, 2016

(65) Prior Publication Data
US 2016/0124209 A1  May 5, 2016

Related U.S. Application Data

(63) Continuation of application No. PCT/JP2014/069367, filed on Jul. 22, 2014.

(30) Foreign Application Priority Data

Jul. 25, 2013 (JP) .................................. 2013-155056

(51) Int. Cl.
*G02B 21/36* (2006.01)
*H04N 5/243* (2006.01)
(Continued)

(52) U.S. Cl.
CPC ............ *G02B 21/367* (2013.01); *G06T 5/008* (2013.01); *G06T 5/50* (2013.01); *H04N 1/3876* (2013.01);
(Continued)

(58) Field of Classification Search
None
See application file for complete search history.

(56) References Cited

U.S. PATENT DOCUMENTS

| 2012/0257088 A1 | 10/2012 | Ishii |
| 2013/0044940 A1* | 2/2013 | Cohen ................ G06K 9/00134 |
| | | 382/154 |
| 2014/0293035 A1 | 10/2014 | Horie |

FOREIGN PATENT DOCUMENTS

| JP | 2006-171213 A | 6/2006 |
| JP | 2008-051773 A | 3/2008 |

(Continued)

OTHER PUBLICATIONS

Extended Supplementary European Search Report dated Feb. 17, 2017 in European Patent Application No. 14 82 9037.2.

(Continued)

*Primary Examiner* — Anand S Rao
*Assistant Examiner* — Smauel D Fereja
(74) *Attorney, Agent, or Firm* — Scully, Scott, Murphy & Presser, P.C.

(57) ABSTRACT

An image processing device includes: an image acquiring unit configured to acquire a plurality of images of different imaging fields of view on the same subject; an image selector configured to select, from the plurality of images acquired, in which a common region of a predetermined size is set at a common position in the individual images, a plurality of image pairs that are combinations of images in which a subject image in the common region in one image corresponds to a subject image in a region other than the common region in another image; a correction gain calculating unit configured to calculate a correction gain for performing shading correction; and an image correcting unit configured to correct shading produced in a correction-target image, using the correction gain calculated by the correction gain calculating unit.

14 Claims, 21 Drawing Sheets

(51) Int. Cl.

| | |
|---|---|
| *H04N 1/401* | (2006.01) |
| *H04N 1/387* | (2006.01) |
| *G06T 5/00* | (2006.01) |
| *G06T 5/50* | (2006.01) |
| *H04N 5/232* | (2006.01) |
| *H04N 5/357* | (2011.01) |
| *H04N 7/18* | (2006.01) |

(52) U.S. Cl.
CPC ......... *H04N 1/401* (2013.01); *H04N 5/23296* (2013.01); *H04N 5/243* (2013.01); *H04N 5/3572* (2013.01); *H04N 7/183* (2013.01); *G06T 2207/10056* (2013.01)

(56) References Cited

FOREIGN PATENT DOCUMENTS

| JP | 2012-222669 A | 11/2012 |
|---|---|---|
| JP | 2013-132027 A | 7/2013 |
| JP | 2013-257422 A | 12/2013 |
| JP | 2014-178781 A | 9/2014 |
| WO | 2013/027513 A1 | 2/2013 |

OTHER PUBLICATIONS

Piccinini, F. et al., "Vignetting and photo-bleaching correction in automated fluorescence microscopy from an array of overlapping images", 2013 IEEE 10th International Symposium on Biomedical Imaging: From Nana to Macro, Apr. 7-11, 2013, pp. 464-467.

Seon Joo Kim, et al., "Robust Radiometric Calibration and Vignetting Correction", IEEE Transactions on Pattern Analysis and Machine Intelligence, vol. 30, No. 4, Apr. 1, 2008, pp. 562-576.

Piccinini, F. et al., "Solutions to Common Issues in Widefield Microscopy: Vignetting, Mosaicing and Depth of Focus", Apr. 19, 2013, pp. 1-188. Retrieved from the internet: URL:http://amsdottorato.unibo.it/5421/1/Piccinini_Filippo_tesi.pdf [retrieved on Feb. 8, 2017] with English and Italian abstracts.

Japanese Office Action dated Jul. 25, 2017 in Japanese Patent Application No. 2013-155056.

International Search Report dated Oct. 28, 2014 issued in PCT/JP2014/069367.

\* cited by examiner

FIG.17

IMAGE PROCESSING DEVICE, IMAGE PROCESSING METHOD, MICROSCOPE SYSTEM, AND COMPUTER-READABLE RECORDING MEDIUM

CROSS-REFERENCE TO RELATED APPLICATIONS

This application is a continuation of PCT international application Ser. No. PCT/JP2014/069367 filed on Jul. 22, 2014 which designates the United States, incorporated herein by reference, and which claims the benefit of priority from Japanese Patent Application No. 2013-155056, filed on Jul. 25, 2013, incorporated herein by reference.

BACKGROUND

1. Technical Field

The disclosure relates to an image processing device, an image processing method, a microscope system, and a computer-readable recording medium for performing shading correction on images acquired by imaging specimens or the like.

2. Related Art

In recent years, the so-called virtual slide technology that registers an image taken of a specimen placed on a slide glass as electronic data so that a user can observe the image on a monitor of a personal computer or the like has been known. The virtual slide technology sequentially joins partial images of a specimen enlarged by a microscope together, thereby constructing a high-resolution image of the entire specimen. Specifically, a technology of acquiring a plurality of images of different fields of view on the same subject, and joining these images together to generate an enlarged image of the subject is the virtual slide technology.

Microscopes consist mainly of a light source to illuminate a specimen and an optical system to enlarge an image of the specimen. At a later stage of the optical system, an imaging element to convert an enlarged image of a specimen into electronic data is provided. Therefore, there is a problem that unevenness in brightness is produced in an acquired image due to unevenness in illuminance of the light source, non-uniformity of the optical system, and in addition, unevenness in the characteristics of the imaging element, and the like. The unevenness in brightness is called shading, in which the brightness generally changes to be darker as it moves away from the center of an image corresponding to the location of the optical axis of the optical system. Therefore, when a plurality of images is joined together to create a virtual slide image, unnatural boundaries are produced at the joints of the images. Further, by joining a plurality of images, shading is repeated. Thus it seems as if there is a periodic pattern on the specimen.

To counter this situation, a shading correction technology of acquiring a shading pattern previously as a calibration image, and correcting an image of a specimen, based on the calibration image is known. For example, Japanese Laid-open Patent Publication No. 2006-171213 discloses a shading correction technology of using, as a calibration image, an image acquired by performing, for transmitted-light illumination observation, imaging with a specimen retracted outside the angle of view of an optical system, or performing, for epi-illumination observation, imaging with a reflective member disposed in the angle of view of the optical system. Japanese Laid-open Patent Publication No. 2008-51773 discloses a method of acquiring data for shading correction by performing imaging with a uniform fluorescent sample as a calibration sample for fluorescent observation.

SUMMARY

In some embodiments, an image processing device includes: an image acquiring unit configured to acquire a plurality of images of different imaging fields of view on the same subject; an image selector configured to select, from the plurality of images acquired, in which a common region of a predetermined size is set at a common position in the individual images, a plurality of image pairs that are combinations of images in which a subject image in the common region in one image corresponds to a subject image in a region other than the common region in another image; a correction gain calculating unit configured to calculate a correction gain for performing shading correction, based on a pixel value of a pixel contained in the common region and a pixel value of a pixel contained in a region corresponding to the common region, for each combination of the one image and the another image; and an image correcting unit configured to correct shading produced in a correction-target image, using the correction gain calculated by the correction gain calculating unit.

In some embodiments, an image processing method includes: an image acquisition step of acquiring a plurality of images of different imaging fields of view on the same subject; an image selection step of selecting, from the plurality of images acquired, in which a common region of a predetermined size is set at a common position in the individual images, a plurality of image pairs that are combinations of images in which a subject image in the common region in one image corresponds to a subject image in a region other than the common region in another image; a correction gain calculation step of calculating a correction gain for performing shading correction, based on a pixel value of a pixel contained in the common region and a pixel value of a pixel contained in a region corresponding to the common region, for each combination of the one image and the another image; and an image correction step of correcting shading produced in a correction-target image, using the correction gain calculated in the correction gain calculation step.

In some embodiments, a microscope system includes: the image processing device; an illuminating unit configured to illuminate the subject; an imaging unit configured to image the subject; and an optical system configured to guide transmitted light or reflected light from the subject to the imaging unit.

In some embodiments, a non-transitory computer-readable recording medium recording an image processing program for causing a computer to execute: an image acquisition step of acquiring a plurality of images of different imaging fields of view on the same subject; an image selection step of selecting, from the plurality of images acquired, in which a common region of a predetermined size is set at a common position in the individual images, a plurality of image pairs that are combinations of images in which a subject image in the common region in one image corresponds to a subject image in a region other than the common region in another image; a correction gain calculation step of calculating a correction gain for performing shading correction, based on a pixel value of a pixel contained in the common region and a pixel value of a pixel contained in a region corresponding to the common region, for each combination of the one image and the another image; and an image correction step of correcting shading produced in a correction-target image, using the correction gain calculated in the correction gain calculation step.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a schematic diagram for illustrating combinations of images used for calculation of correction gains in the second modification;

DETAILED DESCRIPTION

Hereinafter, embodiments of an image processing device, an image processing method, a microscope system, and an image processing program according to the present invention will be described in detail with reference to the drawings. These embodiments are not intended to limit the present invention. The same reference signs are used to designate the same elements throughout the drawings.

First Embodiment

Figure 1:
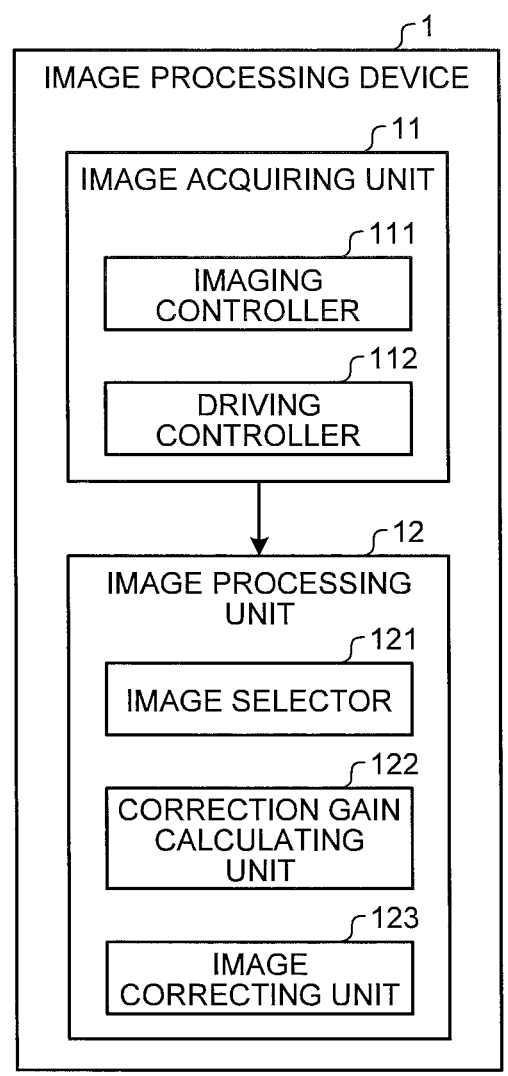
FIG. 1 is a block diagram illustrating a configuration example of an image processing device according to a first embodiment of the present invention.

FIG. 1 is a block diagram illustrating an image processing device according to a first embodiment of the present invention. As shown in FIG. 1, an image processing device 1 according to the first embodiment includes an image acquiring unit 11 that acquires images of a subject to be observed, and an image processing unit 12 that performs predetermined image processing on the images.

The image acquiring unit 11 acquires a plurality of images of different imaging fields of view to a subject. The image acquiring unit 11 may acquire these images directly from an imaging device, or may acquire them through a network, a storage device, or the like. In the first embodiment, the image acquiring unit 11 acquires images generated by an imaging device performing imaging, from the imaging device. The type of the imaging device is not particularly limited, and may be a microscope apparatus with an imaging function, or may be a digital camera, for example.

The image acquiring unit 11 includes an imaging controller 111 that controls an imaging operation of the imaging device, and a driving controller 112 that performs control to change the imaging field of view of the imaging device to a subject. For the imaging device, the driving controller 112 changes the relative position of an optical system included in the imaging device to a subject, thereby changing the imaging field of view to the subject. The imaging controller 111 causes the imaging device to perform imaging at a predetermined timing, in conjunction with a control operation of the driving controller 112, to capture an image from the imaging device.

The image processing unit 12 executes image processing to correct shading produced in a plurality of images acquired by the image acquiring unit 11, using these images. Here, in the images acquired by the imaging device, except for a central region, unevenness in brightness is produced due to unevenness in luminance of a light source, nonuniformity of an optical system, unevenness in the characteristics of an imaging element, or the like. This unevenness in brightness is called shading, and processing to correct unevenness in brightness is called shading correction. The image processing unit 12 includes an image selector 121, a correction gain calculating unit 122, and an image correcting unit 123.

The image selector 121 selects a predetermined number of image pairs of different combinations of images, from a plurality of images acquired by the image acquiring unit 11.

The correction gain calculating unit 122 calculates correction gains to correct shading produced in an image acquired by the image acquiring unit 11, using a predetermined number of image pairs selected by the image selector 121.

The image correcting unit 123 performs shading correction on an image acquired by the image acquiring unit 11, using correction gains calculated by the correction gain calculating unit 122, thereby acquiring a shading-suppressed corrected image.

Figure 2:
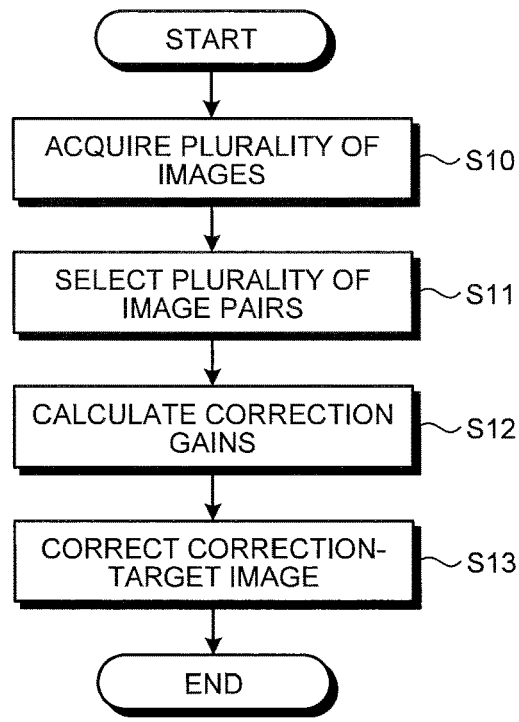
FIG. 2 is a flowchart illustrating an operation of the image processing device illustrated in FIG. 1.

Next, an operation of the image processing device 1 will be described. FIG. 2 is a flowchart illustrating the operation of the image processing device 1. First, in step S10, the image acquiring unit 11 acquires a plurality of images of different imaging fields of view. More specifically, the image acquiring unit 11 sequentially acquires images taken while the imaging field of view is moved by a predetermined amount at a time with respect to a subject to be observed. When imaging is performed, the imaging field of view may be moved with the subject side fixed, or the subject side may be moved with the imaging field of view fixed. Alternatively, both of the subject and the imaging field of view may be moved in opposite directions.

The amount of movement by which the imaging field of view is moved each time imaging is performed and the total number of times of imaging (i.e. the number of images acquired) can be determined according to the size of a central part region in an image where shading hardly occurs and the brightness attenuation rate relative to the center of the image is less than or equal to a predetermined value. Here, as described above, since shading is caused by the light source, the optical system, and the characteristics of the imaging element, the central part region can be set commonly for each image. Hereinafter, this region is called a common region. In the first embodiment, a central rectangular region when each side of an image is divided into N (N is an odd number not less than three) is set as a common region. A method of setting a common region will be described below.

In this case, with the length of a horizontal side of an imaging field of view V as $L_A$, and with the length of a vertical side as $L_B$, the amount of movement of the imaging field of view V at a time is $L_A/N$ in a horizontal direction or $L_B/N$ in a vertical direction. The total number of images to be acquired only needs to be at least $(3N-1)/2$. For example, when an image is divided into 5×5=25 regions, at least seven images are acquired.

Figure 3:
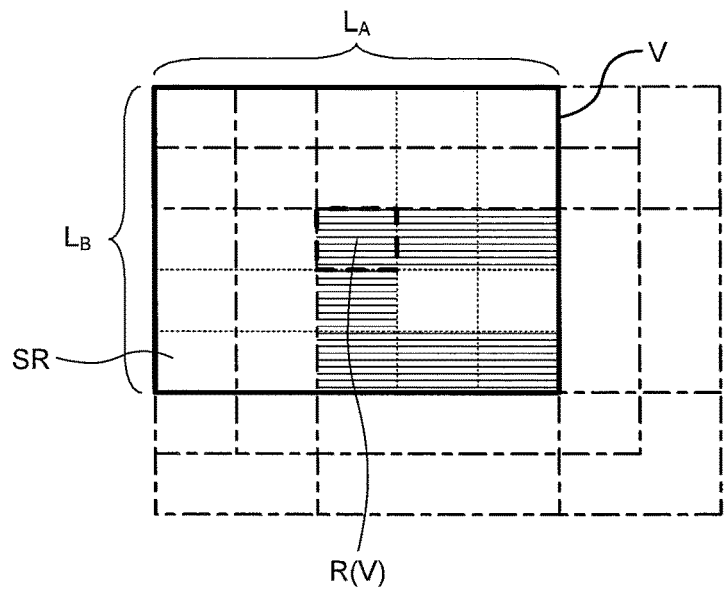
FIG. 3 is a schematic diagram illustrating an example of a moving pattern of an imaging field of view when a plurality of images is acquired.

As an example of a moving pattern of the imaging field of view V, in the first embodiment, as shown in FIG. 3, the imaging field of view V is moved so that the locus of the movement is in a C shape. Specifically, first, imaging is performed $\{(N-1)/2+1\}$ times while the imaging field of view V is moved by a length of $L_A/N$ at a time in a horizontal direction, and imaging is performed $\{(N-1)/2\}$ times while the imaging field of view V is moved by a length of $L_B/N$ at a time in a vertical direction from one end of an imaged region, and further, imaging is performed $\{(N-1)/2\}$ times while the imaging field of view V is moved by the length of $L_A/N$ at a time in a horizontal direction from another end of an imaged region. In FIG. 3, the outline of the imaging field of view V when the imaging field of view V is moved is illustrated by dash-dot lines, and the positions of a region R(V) in the imaging field of view V corresponding to common regions in images are hatched. By moving the imaging field of view V as described above, the locus of the movement of the imaging field of view V is in the C shape opening on the right side in the drawing. The C-shaped moving pattern illustrated in FIG. 3 may be rotated 90°, 180°, and 270°.

Figure 4:
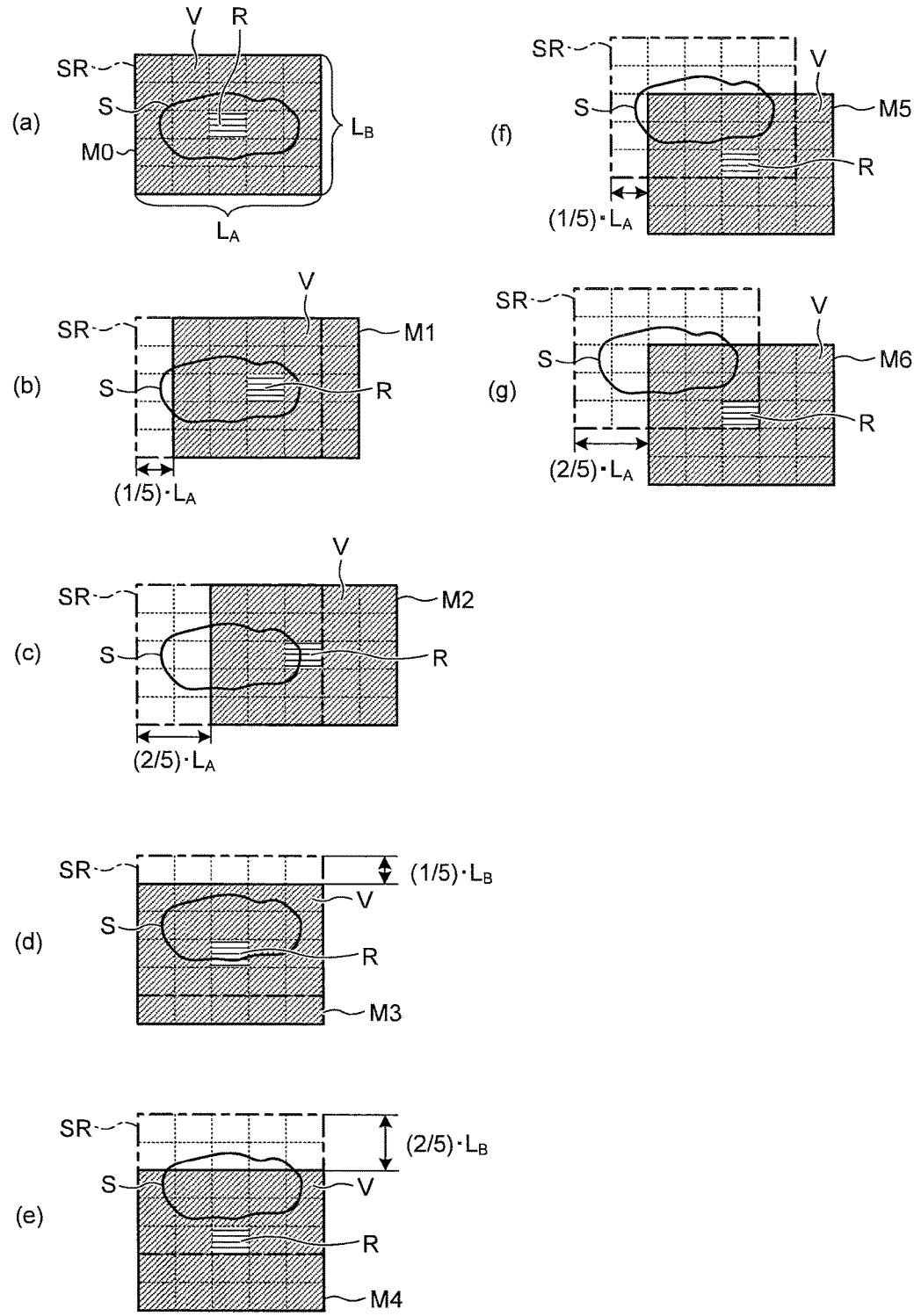
FIG. 4 is a schematic diagram illustrating an example of images acquired by the moving pattern of the imaging field of view illustrated in FIG. 3.

A specific example of a plurality of images acquired by performing imaging in this manner will be described with reference to FIG. 4. In FIG. 4, in order to clarify the moving direction and the moving amount of the imaging field of view V, a subject region SR and a subject S disposed in the subject region SR are illustrated for reference. However, it is not necessary to set the subject region SR particularly when imaging is actually performed. It is only necessary that images sequentially taken have different imaging fields of view V.

First, as shown in FIG. 4(a), an image M0 is acquired by performing imaging with the imaging field of view V aligned with the subject region SR. Next, as shown in FIG. 4(b), an image M1 is acquired by performing imaging with the imaging field of view V moved to the right by $L_A/5$ with respect to the subject region SR. Next, as shown in FIG. 4(c), an image M2 is acquired by moving the imaging field of view V to the right further by $L_A/5$. Next, as shown in FIG. 4(d), an image M3 is acquired by moving the imaging field of view V downward from the subject region SR by $L_B/5$. Next, as shown in FIG. 4(e), an image M4 is acquired by moving the imaging field of view V downward further by $L_B/5$. Next, as shown in FIG. 4(f), an image M5 is acquired by moving the imaging field of view V to the right by $L_A/5$. Next, as shown in FIG. 4(g), an image M6 is acquired by moving the imaging field of view V to the right further by $L_A/5$. In FIGS. 4(a) to 4(g), a common region R is illustrated in the images M0 to M6.

Here, the common region R can be set as follows, as an example. First, images are created by artificially adding shading to a flat image that is considered to be easy to perceive shading, to have an observer evaluate from what degree of shading he or she notices. Then, an attenuation rate is calculated from a maximum value and a minimum value of luminance values on a horizontal line passing through the center of an image whose shading was evaluated as noticeable, and this is set as a reference attenuation rate as an objective evaluation value. As an objective evaluation value, an attenuation rate on a diagonal line in an image, a root-mean-square error (RMSE) with respect to correct answer data, or the like may be used.

Next, an image is acquired by imaging a flat sample such as a mirror. In the image, an area where the above-described reference attenuation rate is exceeded, that is, an area where the brightness is attenuated more than a criterion is set as a shading area.

On the other hand, by imaging various subjects while moving the imaging field of view V in a horizontal direction and a vertical direction by ⅓, ⅕, and ⅐ of the length of each side of the imaging field of view V at a time as illustrated in FIG. 3, images are acquired. Then, for each image, the presence or absence of shading is evaluated based on the subjectivity of an observer.

A shading area is determined from such objective evaluation and subjective evaluation, and a rectangular common region R is set in a central part region not included in the shading area.

This common region R is preset for individual imaging devices and for each condition such as imaging magnification.

Considering positional displacement or the like during imaging, in actuality, imaging may be performed with the horizontal and vertical sides of a common region set longer, compared to the common region R determined by the above-described method.

In subsequent step S11, the image selector 121 selects a plurality of image pairs in which two different images are combined, from the plurality of images acquired in step S10. Two images are selected so that in each image pair, a subject image SI in a common region R in one image corresponds to a subject image SI in a region other than a common region R in another image. The image selector 121 selects at least $(N^2-1)/2$ image pairs so that combinations of two images are different between different image pairs.

Image pairs selected from the images M0 to M6 illustrated in FIG. 4 are illustrated in FIGS. 5 to 8. Specifically, twelve different image pairs, the images M0 and M1 (see FIGS. 5(a) and 5(b)), the images M0 and M2 (see FIGS. 5(c) and 5(d)), the images M0 and M3 (see FIGS. 5(e) and 5(f)), the images M1 and M3 (see FIGS. 6(a) and 6(b)), the images M2 and M3 (see FIGS. 6(c) and 6(d)), the images M3 and M5 (see FIGS. 6(e) and 6(f)), the images M3 and M6 (see FIGS. 7(a) and 7(b)), the images M0 and M4 (see FIGS. 7(c) and 7(d)), the images M0 and M5 (see FIGS. 7(e) and 7(f)), the images M0 and M6 (see FIGS. 8(a) and 8(b)), the images M1 and M4 (see FIGS. 8(c) and 8(d)), and the images M2 and M4 (see FIGS. 8(e) and 8(f)), are selected. In FIGS. 5 to 8, in order to clarify the correspondence relationship between two images, a subject region SR is illustrated for reference.

In subsequent step S12, the correction gain calculating unit 122 calculates a correction gain for correcting shading produced in each image for each region in the image, using the plurality of image pairs selected in step S11, and creates a gain map GM showing the distribution of correction gains.

Figures 9, 10:
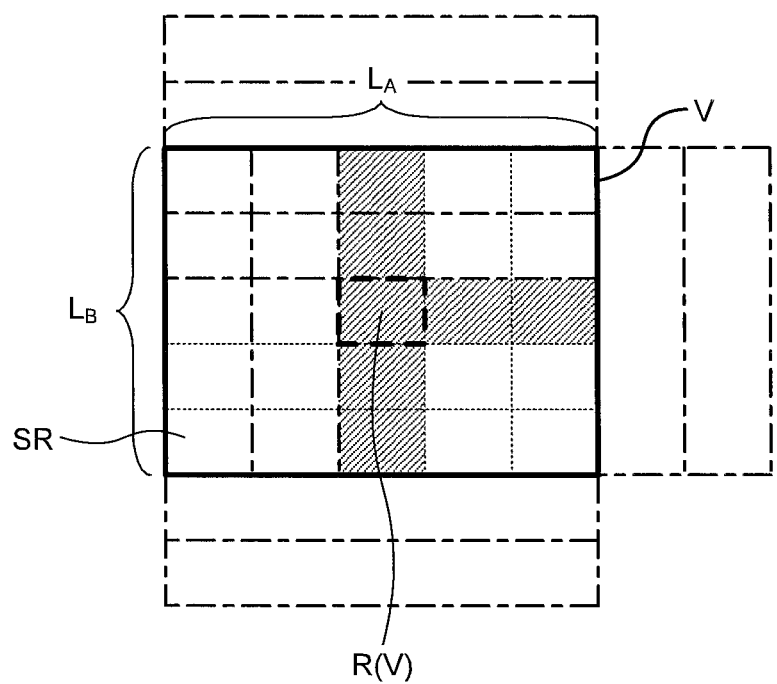
FIG. 9 is a schematic diagram illustrating regions of an image divided into N×N.
FIG. 10 is a schematic diagram illustrating an example of a moving pattern of an imaging field of view when a plurality of images is acquired in a first modification of the first embodiment of the present invention.
Figure 11:
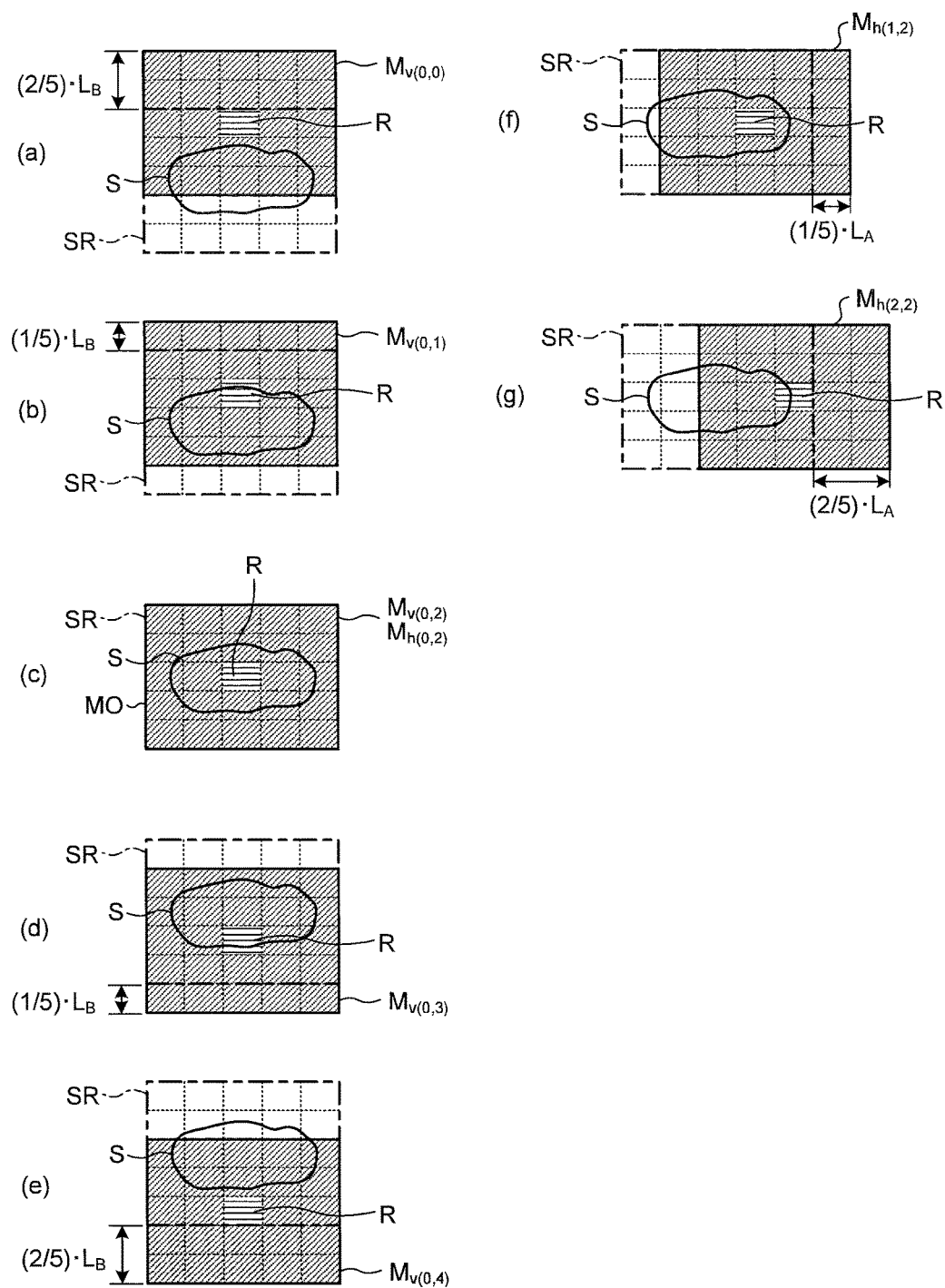
FIG. 11 is a schematic diagram illustrating an example of images acquired by the moving pattern of the imaging field of view illustrated in FIG. 10.

For that, the correction gain calculating unit 122 first divides the images M0 to M6 into N×N regions as illustrated in FIG. 9. Hereinafter, each of the divided regions is denoted as a region (x, y) (0≤x<N, 0≤y<N). Thus divided, a common region R located in a central portion of each image can be expressed as a region ((N−1)/2, (N−1)/2). Since N=5 in the first embodiment, 0≤x<5, 0≤y<5, and a common region R is a region (2, 2).

Next, the correction gain calculating unit 122 compares a common region R in one image of each image pair (hereinafter, referred to as a reference image) to a region (x, y) in another image showing a subject image identical to a subject image shown in the common region R (hereinafter, referred to as a comparative image).

When the pixel value of a pixel contained in the region (x, y) in the comparative image is $I_{CONT(x, y)}$, and the pixel value of a pixel contained in the common region R in the reference image is $I_{BASE(R)}$, shading SH(x, y) produced in the region (x, y) in the comparative image is given by the following expression (1):

$$SH(x, y) = I_{CONT(x, y)} / I_{BASE(R)} \quad (1)$$

Thus, correction gain G(x, y) to remove shading in the region (x, y) in each image is given by the following expression (2):

$$G(x, y) = I_{BASE(R)} / I_{CONT(x, y)} \quad (2)$$

Figure 5:
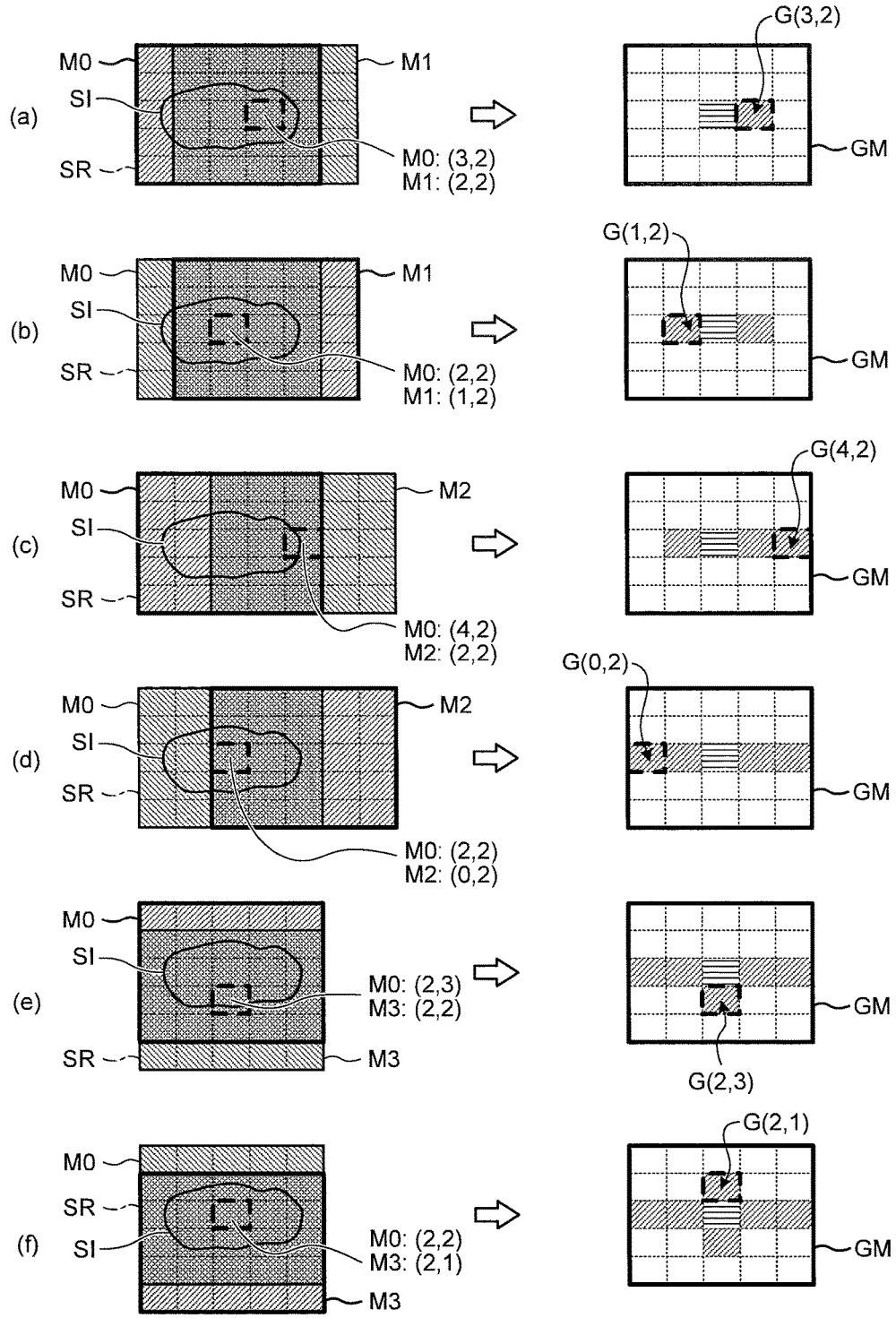
FIG. 5 is a schematic diagram illustrating combinations of images selected by an image selector illustrated in FIG. 1.
Figure 6:
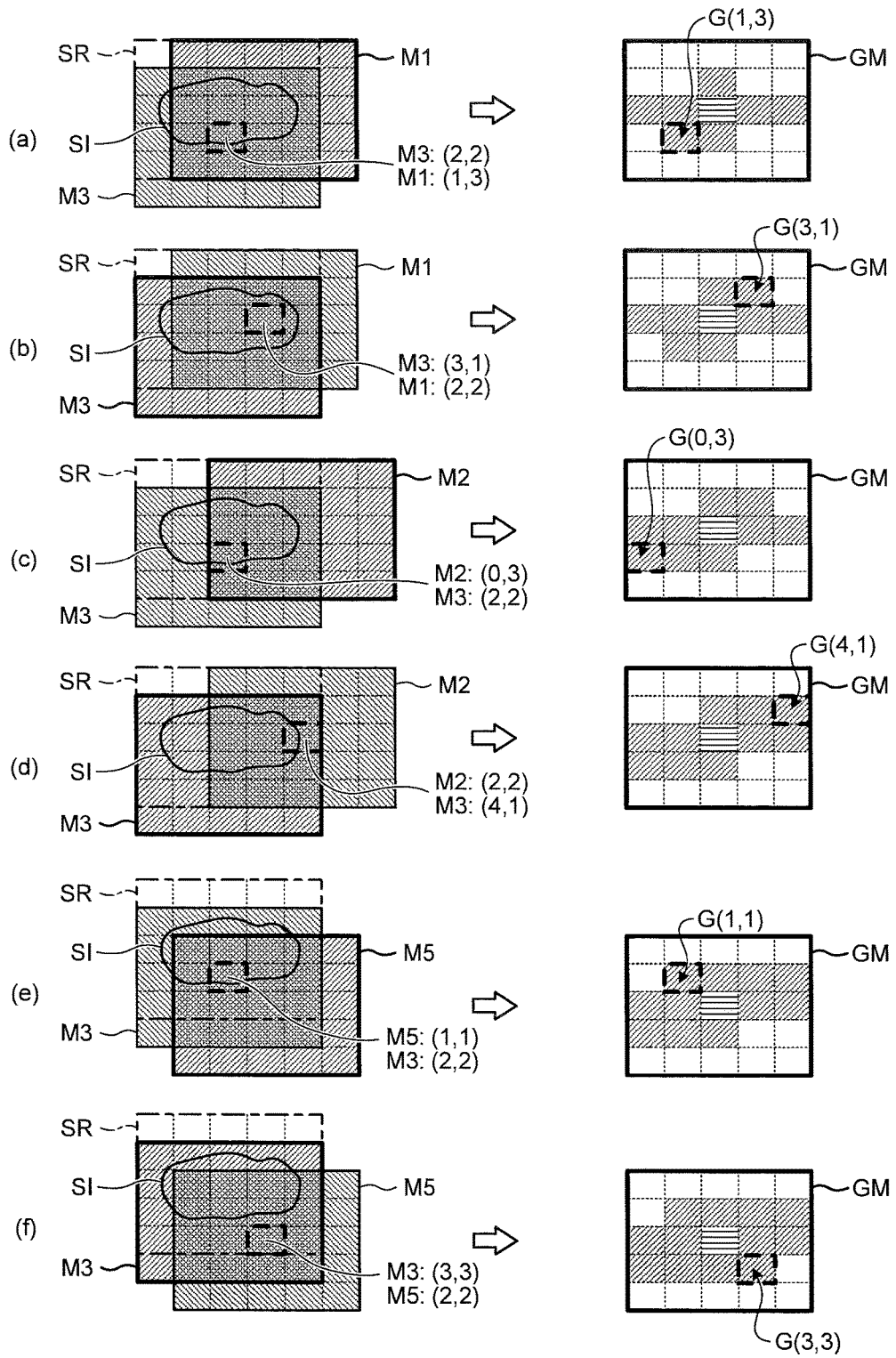
FIG. 6 is a schematic diagram illustrating combinations of images selected by the image selector illustrated in FIG. 1.
Figure 7:
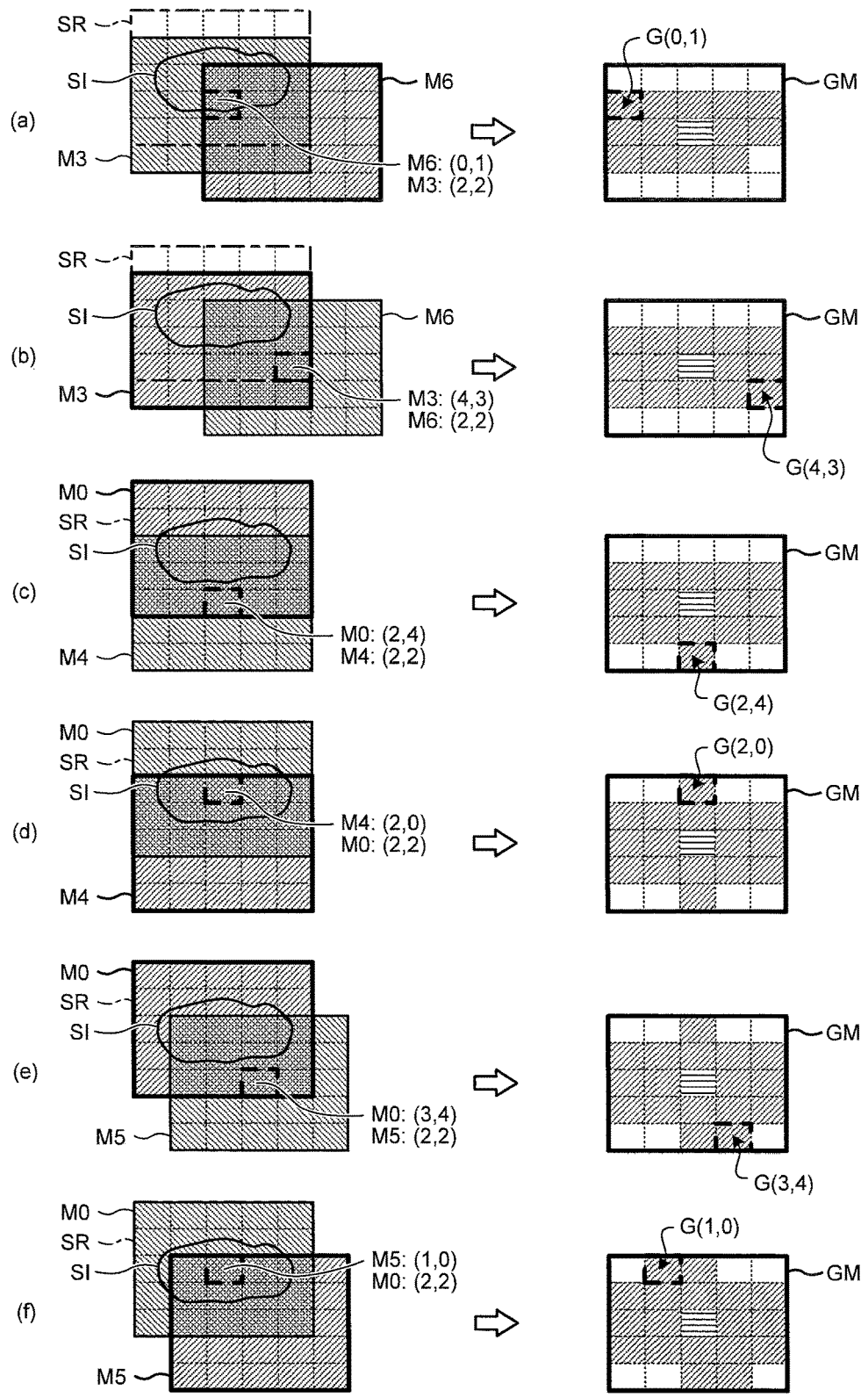
FIG. 7 is a schematic diagram illustrating combinations of images selected by the image selector illustrated in FIG. 1.
Figure 8:
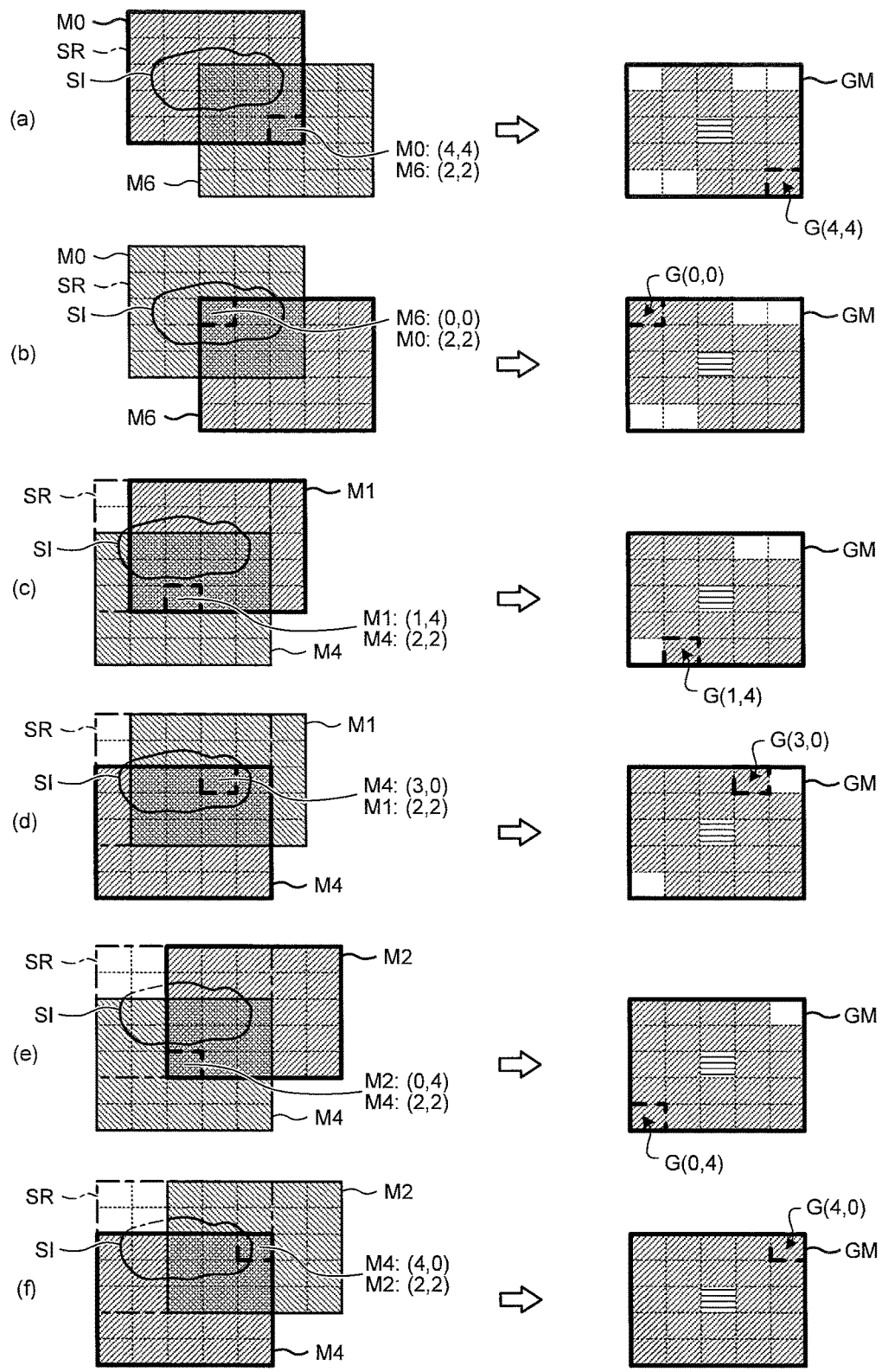
FIG. 8 is a schematic diagram illustrating combinations of images selected by the image selector illustrated in FIG. 1.

For example, in the case of FIG. 5(a), when the image M1 is a reference image and the image M0 is a comparative image, by comparing a region (2, 2) in the image M1 to a region (3, 2) in the image M0, correction gain G(3, 2) in the region (3, 2) in the gain map GM is calculated. As shown in FIG. 5(b), in the same pair of the images M0 and M1, when the image M1 is a comparative image, and the image M0 is a reference image, by comparing a region (2, 2), a common region R in the image M0, to a region (1, 2) in the image M1 corresponding to the region (2, 2), correction gain G(1, 2) in the region (1, 2) is calculated. In FIGS. 5 to 8, the outline of an image set as a comparative image is illustrated by a thick line.

That is, by performing calculations to determine correction gains by comparing a common region R in a reference image to a region in a comparative image corresponding to the common region R, interchanging the comparative image and the reference image in a single image pair, correction gains in two regions can be obtained. Then, as shown in FIGS. 5(a) to 8(f), by performing the above-described calculation on all image pairs selected in step S11, correction gains G(x, y) in all regions in the image can be obtained. In FIGS. 5 to 8, a region (x, y) in the gain map GM in which correction gain G(x, y) has already been calculated is hatched with oblique lines. In common regions R in the images M0 to M6, shading hardly occurs, and thus it is not necessary to calculate a correction gain. Thus, in FIGS. 5 to 8, to a central region in the gain map GM corresponding to a common region R, hatching of a type different from that in the other regions is provided for distinction.

In subsequent step S13, the image correcting unit 123 performs correction by applying a gain map created in step S13 to a correction-target image acquired by the image acquiring unit 11. Thus, a shading-removed corrected image is acquired.

Thereafter, the operation of the image processing device 1 is complete.

Next, combinations of images used for calculating correction gains will be described with a case of N=5 as an example.

In the first embodiment, the images M0 to M6 are acquired by scanning the imaging field of view V twice in the horizontal direction, and scanning it once in the vertical direction. Thus, in the following description, according to the moving direction and the moving amount of the imaging field of view V, the images M0, M1, M2, M3, M4, M5, and M6 are denoted as images $M_{h<0,\ 0>}$, $M_{h<1,\ 0>}$, $M_{h<2,\ 0>}$, $M_{v<0,\ 1>}$, $M_{v<0,\ 2>}$, $M_{h<1,\ 2>}$, and $M_{h<2,\ 2>}$, respectively. An image $M_{h<p,\ q>}$ is an image acquired while the imaging field of view V is moved in the horizontal direction, and an image $M_{v<p,\ q>}$ is an image acquired while the imaging field of view V is moved in the vertical direction. Symbol p represents the number of movements of the imaging field of view V in the horizontal direction, and symbol q represents the number of movements of the imaging field of view V in the vertical direction. The image $M_{h<0,\ 0>}$ (image M0) is also a starting point when the imaging field of view V is moved in the vertical direction, and is thus also denoted as an image $M_{v<0,\ 0>}$. The image $M_{v<0,\ 2>}$ (image M4) is also a starting point when the imaging field of view V is moved in the horizontal direction, and is thus also denoted as an image $M_{h<0,\ 2>}$.

In this case, correction gain G(x, y) in a region (x, y) is given by the following expression (3):

$$G(x, y) = \begin{cases} COMP(M_{h<2-x, 2>}, M_{v<0, y>}) & (x < 2, y < 2) \\ COMP(M_{v<0, 2-y>}, M_{h<x-2, 0>}) & (x > 1, y < 2) \\ COMP(M_{<2-x, 0>}, M_{v<0, y-2>}) & (x < 2, y > 1) \\ COMP(M_{v<0, 4-y>}, M_{h<x-2, 2>}) & (x > 1, y > 1) \end{cases} \quad (3)$$

Here, operator COMP(A, B) denotes processing to calculate a correction gain by comparison between a common region R in image B and a region (x, y) in image A corresponding to the common region R.

As described above, according to the first embodiment, data for shading correction (gain map) can be created without the necessity for a troublesome operation such as retracting a specimen to be observed from an imaging field of view or additionally using a sample for calibration. Thus, high-precision shading correction can be performed more easily and in a shorter time than before.

Further, according to the first embodiment, correction gains in all regions when the inside of an image is divided into $(N^2-1)$ can be calculated based on at least $(3N-1)/2$ images of different imaging fields of view. Thus, the time required to acquire images to be used for calculation of correction gains (imaging time) can be reduced.

Furthermore, according to the first embodiment, since images to be used for calculation of correction gains are acquired by performing imaging while moving the imaging field of view V in a C shape with respect to the subject S, it is not necessary to frequently change the moving direction of the imaging field of view V. Thus, an effect of being able to reduce the influence of a backlash due to change in the moving direction can be obtained.

First Modification

Next, a first modification of the first embodiment of the present invention will be described.

Although in the above-described first embodiment, a plurality of images are acquired by performing imaging while moving the imaging field of view V in the C-shaped pattern, the pattern of moving the imaging field of view V is not limited to this. For example, as shown in FIG. 10, the imaging field of view V may be moved in a vertical direction and in a horizontal direction so that the locus of movement of the imaging field of view V is in a T shape. Also in the first modification, when imaging is actually performed, either of a subject or the imaging field of view V may be moved, or both of them may be moved in opposite directions as long as the imaging field of view V can be moved relatively to the subject.

Specifically, imaging is performed N times while the imaging field of view V is moved in a vertical direction by a length of $L_B/N$ at a time, and next, with an imaging position at the $(N+1)/2$nd time in the vertical direction as a starting point, imaging is performed $(N-1)/2$ times while the imaging field of view V is moved in a horizontal direction by a length of $L_A/N$ at a time. Here, in FIG. 10, the outline of an imaging field of view V when the imaging field of view V is moved is illustrated by dash-dot lines, and positions of a region R(V) in the imaging field of view V corresponding to a common region R are hatched. A T-shaped moving pattern illustrated in FIG. 10 may be rotated 90°, 180°, and 270°.

By performing imaging in this manner, when N=5, for example, seven images, images $M_{v<0, 0>}$, $M_{v<0, 1>}$, $M_{v<0, 2>}$, $M_{v<0, 3>}$, $M_{v<0, 4>}$, $M_{h<1, 2>}$, and $M_{h<2, 2>}$, illustrated in FIGS. 11(a) to 11(g) are acquired. Here, an image $M_{h<p, q>}$ is an image acquired while the imaging field of view V is moved in the horizontal direction, and an image $N_{v<p, q>}$ is an image acquired while the imaging field of view V is moved in the vertical direction. Symbol p represents the number of movements of the imaging field of view V in the horizontal direction, and symbol q represents the number of movements of the imaging field of view V in the vertical direction. The image $M_{v<0, 2>}$ is a starting point when the imaging field of view V is moved in the horizontal direction, and is thus also denoted as an image $M_{h<0, 2>}$. In FIG. 11, in order to clarify the moving direction and the moving amount of the imaging field of view V, a subject region SR and a subject S disposed in the subject region SR are illustrated for reference.

Specifically, as shown in FIG. 11(a), by performing imaging with a position to which the imaging field of view V is shifted upward by $(2/5) L_B$ with respect to the subject region SR as a starting point, the image $N_{v<0, 0>}$ is acquired. Next, as shown in FIGS. 11(b) to 11(e), by performing imaging four times while the imaging field of view V is moved downward by $L_B/5$ at a time, the images $M_{v<0, 1>}$ to $M_{v<0, 4>}$ are acquired. Next, as shown in FIGS. 11(f) and 11(g), by performing imaging twice while the imaging field of view V is moved to the right by $L_A/5$ at a time with a position where the image $M_{h<0, 2>}$ has been acquired as a starting point, the images $M_{h<1, 2>}$ and $M_{h<2, 2>}$ are acquired.

In this case, correction gain G(x, y) in each region (x, y) in an image (see FIG. 9) is given by the following expression (4):

$$G(x, y) = \begin{cases} COMP(M_{h<2-x,0>}, M_{v<0,y>}) & (x < 3) \\ COMP(M_{v<0,4-y>}, M_{h<x-2,0>}) & (x \geq 3) \end{cases} \quad (4)$$

Here, operator COMP(A, B) denotes processing to calculate correction gain G(x, y) by comparison between a common region R in image B and a region (x, y) in image A corresponding to the common region R.

Specifically, on regions (x, y) (x<3, 0≤y<5) in an image, correction gains G(x, y) are calculated by comparing common regions R in the images $M_{v<0, 1>}$ to $M_{v<0, 4>}$ acquired while the imaging field of view V is moved in the vertical direction to regions in the images $M_{h<2, 1>}$ and $M_{h<2, 2>}$ corresponding to the common regions R. On the other hand, on regions (x, y) (x≥3, 0≤y<5) in an image, correction gains G(x, y) are calculated by comparing common regions R in the images $M_{h<2, 1>}$ and $M_{h<2, 2>}$ acquired while the imaging field of view V is moved in the horizontal direction to regions in the images $M_{v<0, 1>}$ to $M_{v<0, 4>}$ corresponding to the common regions R.

Alternatively, correction gain G(x, y) in each region (x, y) in an image may be determined by the following expression (5):

$$G(x, y) = \begin{cases} COMP(M_{h<2-x,0>}, M_{v<0,y>}) & (x < 2) \\ COMP(M_{v<0,4-y>}, M_{h<x-2,0>}) & (x \geq 2) \end{cases} \quad (5)$$

Specifically, on regions (x, y) (x<2, 0≤y<5) in an image, correction gains G(x, y) are calculated by comparing common regions R in the images $M_{v<0, 1>}$ to $M_{v<0, 4>}$ acquired while the imaging field of view V is moved in the vertical direction to regions in the images $M_{h<2, 1>}$ and $M_{h<2, 2>}$ corresponding to the common regions R. On the other hand, on regions (x, y) (x≥2, 0≤y<5) in an image, correction gains G(x, y) may be calculated by comparing common regions R in the images $M_{h<2, 1>}$ and $M_{h<2, 2>}$ acquired while the imaging field of view V is moved in the horizontal direction to regions in the images $M_{v<0, 1>}$ to $M_{v<0, 4>}$ corresponding to the common regions R.

That is, on regions (2, y) (0≤y<5) in an image, either of COMP($M_{h<2-x, 0>}$, $M_{v<0, y>}$) and COMP($M_{v<0, 4-y>}$, $M_{h<x-2, 0>}$) may be used.

Second Embodiment

Next, a second embodiment of the present invention will be described.

Figure 12:
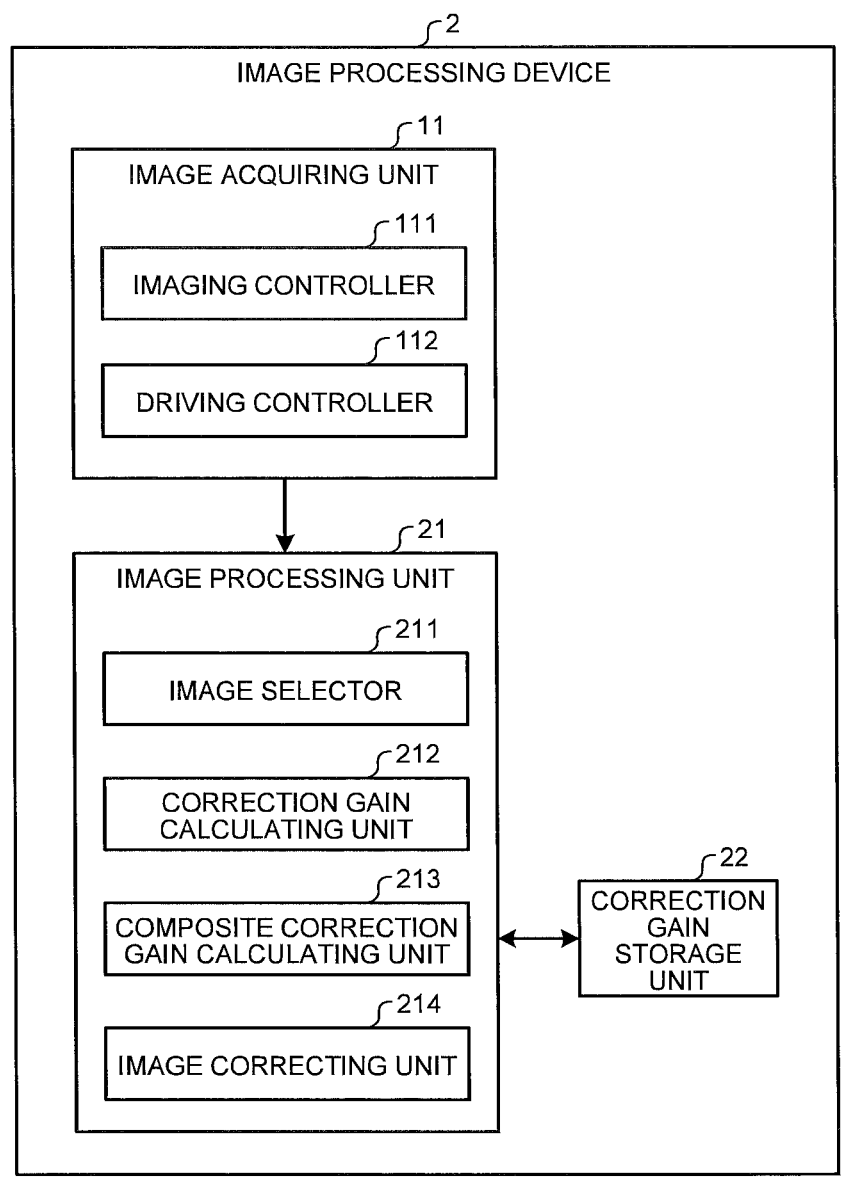
FIG. 12 is a block diagram illustrating a configuration of an image processing device according to a second embodiment of the present invention.

FIG. 12 is a block diagram illustrating a configuration of an image processing device according to the second embodiment. As shown in FIG. 12, an image processing device 2 according to the second embodiment includes an image acquiring unit 11, an image processing unit 21, and a correction gain storage unit 22. Of them, the configuration and operation of the image acquiring unit 11 are the same as those in the first embodiment.

The image processing unit 21 includes an image selector 211, a correction gain calculating unit 212, a composite correction gain calculating unit 213, and an image correcting unit 214.

The image selector 211 selects, from a plurality of images acquired by the image acquiring unit 11, all image pairs in which a common region R in one image corresponds to a region other than a common region R in another image, which are a plurality of image pairs of different combinations of two images.

The correction gain calculating unit 212 calculates correction gains for correcting shading produced in an image acquired by the image acquiring unit 11, using image pairs selected by the image selector 211.

The composite correction gain calculating unit 213 calculates a composite correction gain using a plurality of correction gains calculated on the same region in an imaging field of view V, among all correction gains calculated by the correction gain calculating unit 212.

The image correcting unit 214 performs shading correction on an image acquired by the image acquiring unit 11, using composite correction gains calculated by the composite correction gain calculating unit 213, thereby acquiring a shading-suppressed corrected image.

The correction gain storage unit 22 temporarily stores correction gains calculated by the correction gain calculating unit 212.

Figure 13:
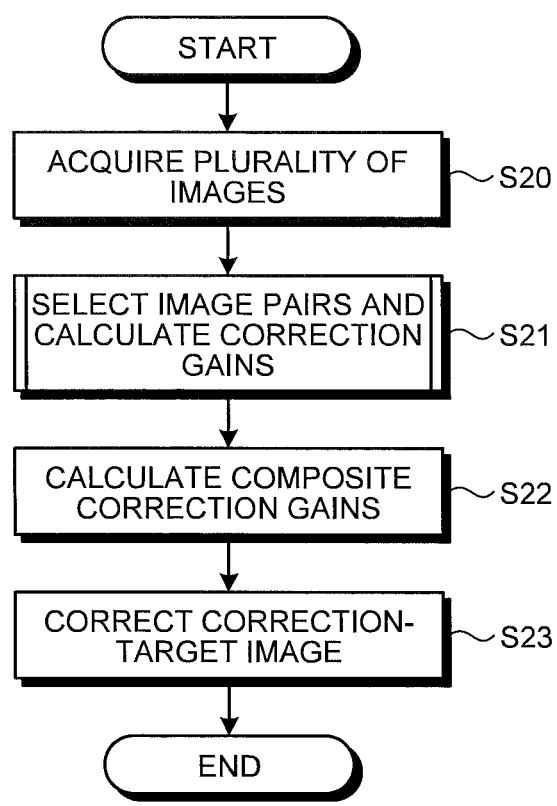
FIG. 13 is a flowchart illustrating an operation of the image processing device illustrated in FIG. 12.

Next, an operation of the image processing device 2 will be described. FIG. 13 is a flowchart illustrating the operation of the image processing device 2. First, in step S20, as in the first embodiment, a plurality of images of different imaging fields of view is acquired. In the second embodiment, as in the first modification of the first embodiment, an imaging field of view V is divided into 25 regions, and imaging is performed while the imaging field of view V is moved in a T-shaped pattern (see FIGS. 10 and 11), thereby acquiring seven images.

In step S21 subsequent to step S20, the image selector 211 sequentially selects all image pairs in which a subject image in a common region R in one image corresponds to a subject image in a region other than a common region R in another image. The correction gain calculating unit 212 calculates a correction gain for correcting shading produced in an image for each region in the image, using the image pairs.

Figure 14:
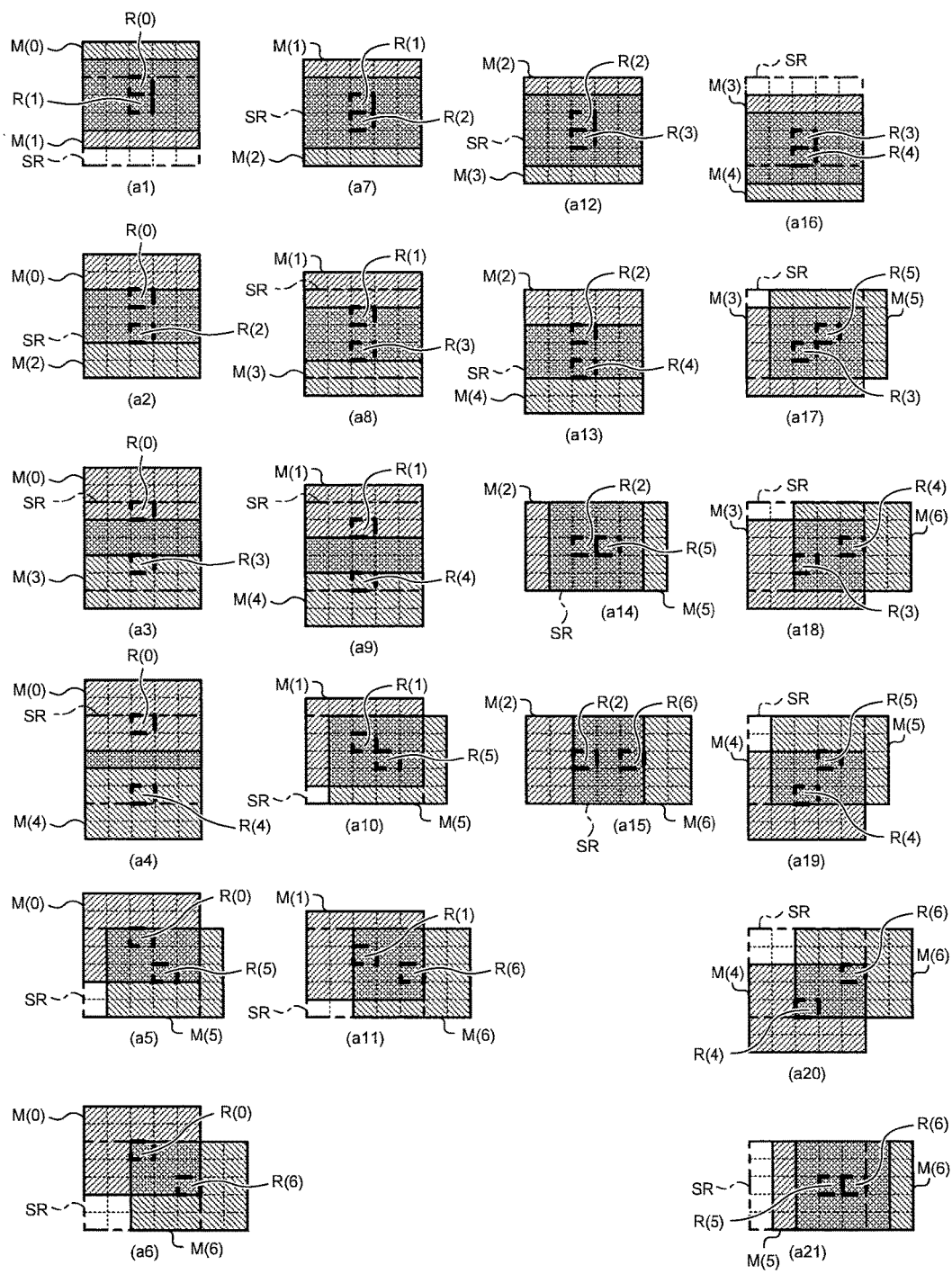
FIG. 14 is a schematic diagram illustrating combinations of images selected by an image selector illustrated in FIG. 12.

FIG. 14 is a schematic diagram illustrating image pairs consisting of two different images, selected from seven images M(0) to M(6) acquired in step S20. As illustrated in FIG. 14, the image pairs include total 42 pairs, the images M(0) and M(1), the images M(1) and M(0) (see FIG. 14($a1$)), the images M(0) and M(2), the images M(2) and M(0) (see FIG. 14($a2$)), ..., the images M(4) and M(6), the images M(6) and M(4) (see FIG. 14($a20$)), the images M(5) and M(6), and the images M(6) and M(5) (see FIG. 14($a21$)). In the second embodiment, an image pair of images M(k) and M(k') will be described distinctively from an image pair of images M(k') and M(k) (k and k' are integers, k≠k'). Common regions R(0) to R(6) illustrated in FIG. 14 are associated with the images M(0) to M(6), respectively.

Of these 42 image pairs, in the image pairs of the images M(0) and M(3), the images M(3) and M(0) (see FIG. 14($a3$)), the images M(0) and M(4), the images M(4) and M(0) (see FIG. 14($a4$)), the images M(1) and M(4), and the images M(4) and M(1) (see FIG. 14($a9$)), a reference region in one image is not superimposed on another image. Therefore, the correction gain calculating unit 212 calculates correction gains G(x, y) given by the following expression (6), sequentially using 36 image pairs other than these six pairs.

$$G(x, y) = COMP(M(i), M(j)) \quad (6)$$

Here, operator COMP(M(i), M(j)) denotes processing to calculate a correction gain by comparison between a common region R(j) in an image M(j) and a region (x, y) in an image M(i) corresponding to the common region R(j). Symbols i and j are parameters representing the serial number of an image selected from the images M(0) to M(6). A method of calculating correction gain G(x, y) is the same as that in the first embodiment (see Expression (2)).

Figure 15:
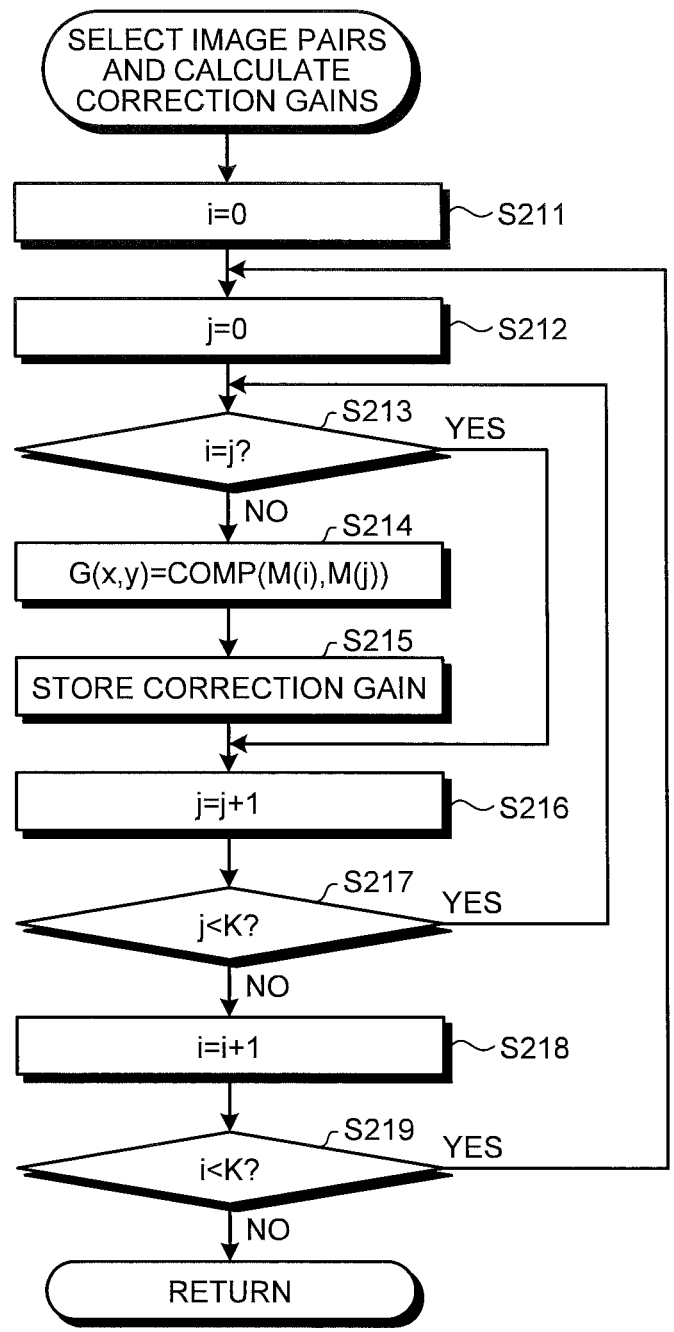
FIG. 15 is a flowchart illustrating arithmetic processing in a step of selecting image pairs and calculating correction gains illustrated in FIG. 13.

FIG. 15 is a flowchart illustrating arithmetic processing in step S21. First, in steps S211 and S212, the image selector 211 sets parameters i and j in Expression (6) to zero as initial setting.

In subsequent step S213, the image selector 211 determines whether i=j or not. When i=j (step S213: Yes), the processing proceeds to step S216.

On the other hand, when i≠j (step S213: No), the correction gain calculating unit 212 calculates a correction gain given by expression (6) (step S214). At this time, when selected images M(i) and M(j) are a combination in which a reference region in one image is not superimposed on another image, the correction gain calculating unit 212 does not calculate a correction gain.

In subsequent step S215, the correction gain storage unit 22 stores the calculated correction gain G(x, y). At this time, the correction gain storage unit 22 may store the correction gain G(x, y) individually, or may integrate a newly calculated correction gain G(x, y) with a previously calculated correction gain in the same region (x, y) to store an integrated value and the number of times of integration. Alternatively, correction gains G(x, y) may be integrated and stored for each pixel in an image.

In subsequent step S216, the image selector 211 increments parameter j.

In step S217, the image selector 211 determines whether parameter j exceeds the number of images K acquired in step S20 (see FIG. 13) or not. In the second embodiment, K=7. When parameter j does not exceed the number of images K (step S217: Yes), the processing returns to step S213.

On the other hand, when parameter j reaches the number of images K (step S217: No), the image selector 211 increments parameter i (step S218).

In step S219, the correction gain calculating unit 212 determines whether parameter i exceeds the number of images K or not. When parameter i does not exceed the number K (step S219: Yes), the processing returns to step S212. On the other hand, when parameter i reaches the number K, the processing returns to a main routine.

In step S22 subsequent to step S21, the composite correction gain calculating unit 213 calculates composite correction gains, using correction gains stored in the correction gain storage unit 22.

Here, in step S21, correction gains of the same region (x, y) may be calculated from different image pairs. For example, as shown in FIG. 14(a1), a correction gain of a region (2, 3) is calculated by comparison between a common region R(1) in the image M(1) and a region (2, 3) in the image M(0) corresponding to the common region R(1). Also, as shown in FIG. 14(a7), a correction gain of the same region (2, 3) is calculated by comparison between a common region R(2) in the image M(2) and a region (2, 3) in the image M(1) corresponding to the common region R(2). Further, as shown in FIG. 14(a12), a correction gain of the same region (2, 3) is calculated by comparison between a common region R(3) in the image M(3) and a region (2, 3) in the image M(2) corresponding to the common region R(3). Furthermore, as shown in FIG. 14(a16), a correction gain of the same region (2, 3) is calculated by comparison between a common region R(4) in the image M(4) and a region (2, 3) in the image M(3) corresponding to the common region R(4). That is, four kinds of correction gains are calculated on the region (2, 3) in the image from image pairs selected from the images M(0) to M(4).

Thus, in step S22, on a region (x, y) on which a plurality of correction gains is calculated, the composite correction gain calculating unit 213 calculates a composite correction gain using the plurality of correction gains. As a composite correction gain, for example, a statistic such as a mean value, a mode, or a median value of a plurality of correction gains is used. Further, the composite correction gain calculating unit 213 creates a gain map using calculated composite correction gains. On a region (x, y) on which only one kind of correction gain is calculated, the calculated correction gain is directly used as a value in a gain map.

In subsequent step S23, the image correcting unit 214 performs correction by applying the gain map created in step S22 to an image acquired by the image acquiring unit 11. Consequently, a shading-suppressed corrected image is acquired.

Thereafter, the operation of the image processing device 2 is complete.

As described above, according to the second embodiment, by using composite correction gains into which a plurality of correction gains calculated from different image pairs is combined, high-precision and robust correction can be performed on an image acquired.

Second Modification

Next, a second modification of the second embodiment of the present invention will be described.

As described above, when one side of an imaging field of view V is divided into N, correction gains can be calculated on all regions in the imaging field of view V by acquiring at least (3N−1)/2 images. For example, when one side of an imaging field of view V is divided into five, it is only necessary to acquire at least seven images. However, by further increasing the number of images acquired, composite correction gains can be calculated on all regions in an imaging field of view V.

Figure 16:
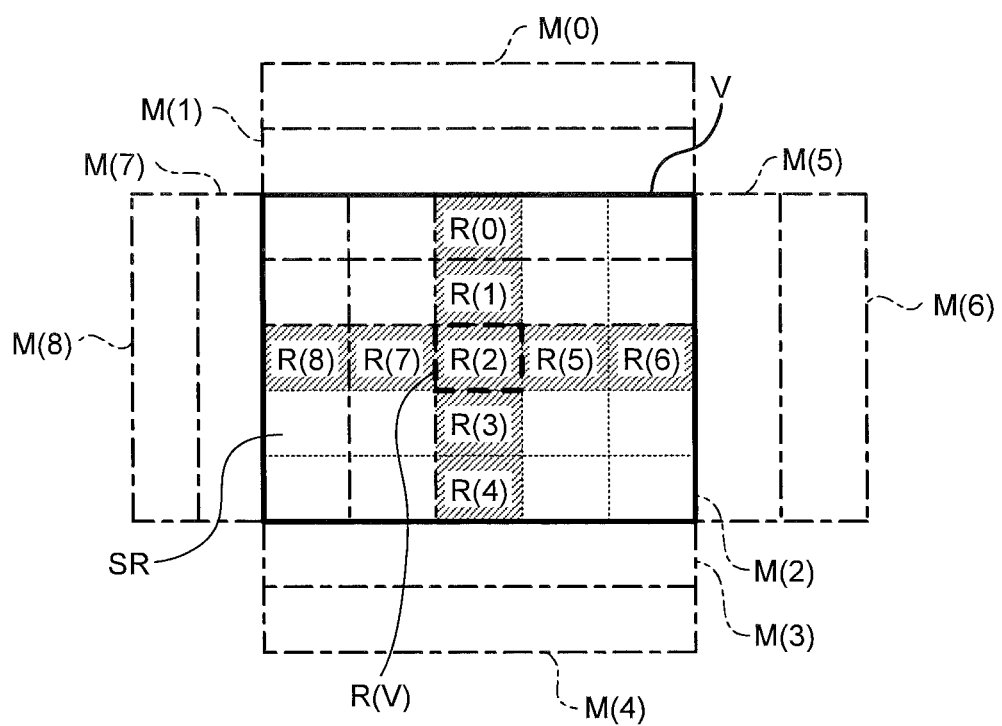
FIG. 16 is a schematic diagram illustrating an example of a moving pattern of an imaging field of view when a plurality of images is acquired in a second modification of the second embodiment of the present invention.

For example, as shown in FIG. 16, when an imaging field of V is divided into 25 regions, by performing imaging while moving the imaging field of view V in a cross-shaped pattern, nine images M(0) to M(8) are acquired. Common regions R(0) to R(8) illustrated in FIG. 16 are associated with the images M(0) to M(8).

In this case, combinations of two different images extracted from the nine images M(0) to M(8) are 72 (=9×8). Of them, combinations of images from which a correction gain cannot be calculated because a reference region in one image is not superimposed on another image are twelve, the images M(0) and M(3), the images M(0) and M(4), the images M(1) and M(4), the images M(3) and M(0), the images M(4) and M(0), the images M(4) and M(1), the images M(6) and M(7), the images M(6) and M(8), the images M(5) and M(8), the images M(7) and M(6), the images M(8) and M(6), and the images M(8) and M(5). Therefore, the correction gain calculating unit 212 uses 60 image pairs other than these twelve combinations to calculate a correction gain G(x, y) in each region (x, y) in an image (see FIG. 9).

Figure 17:
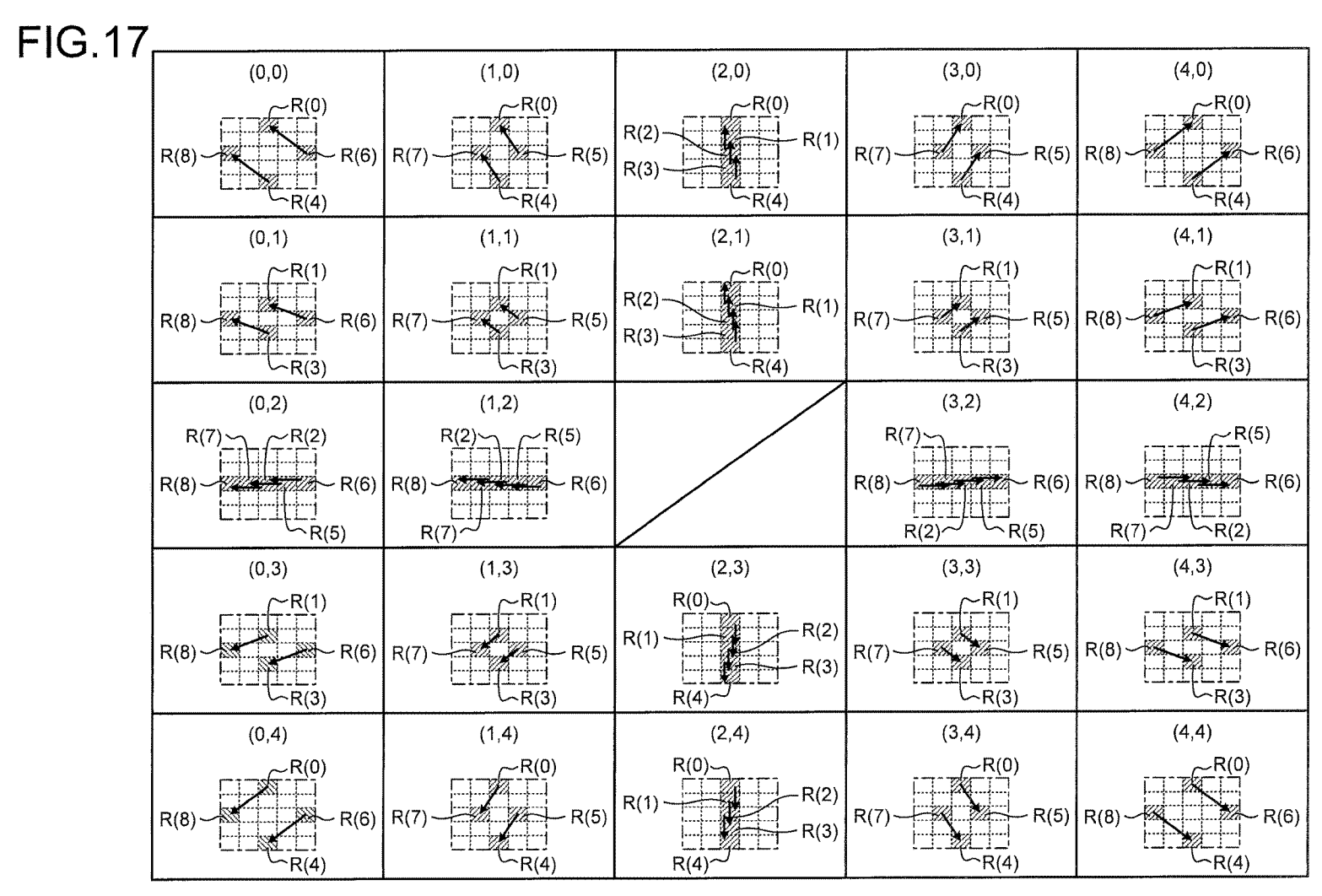

FIG. 17 is a schematic diagram for illustrating image pairs used for calculation of a correction gain G(x, y) in each region (x, y). Each cell in a matrix illustrated in FIG. 17 corresponds to a region (x, y) in an image.

A schematic diagram illustrated in each cell (x, y) illustrates the common regions R(0) to R(8) of image pairs used for calculation of correction gains G(x, y) in a region (x, y) in an image. A correction gain G(x, y) in a certain region (x, y) is given by operator COMP(M(i), M(j)), based on comparison between an image M(i) with a region at the proximal end of an arrow in a cell (x, y) set as a common region R(i), and an image M(j) with a region at the distal end of the arrow set as a common region R(j).

For example, correction gain G(0, 0) in a region (0, 0) can be calculated by comparison between the common region R(0) in the image M(0) and a region (0, 0) in the image M(6) with a subject image corresponding to that in the common region R(0). Correction gain G(0, 0) in the same region (0, 0) can also be calculated by comparison between the common region R(8) in the image M(8) and a region (0, 0) in the image M(4) with a subject image corresponding to that in the common region R(8). That is, on the region (0, 0), two correction gains are calculated from two image pairs, individually. By calculating a statistic (such as a mean value) of these correction gains, a composite correction gain in the region (0, 0) can be obtained.

On other blocks, composite correction gains can be obtained likewise by calculating correction gains from image pairs indicated by arrows, individually, and calculating a statistic of those correction gains.

Thus, according to the second modification, only by increasing the number of images acquired by two compared to the second embodiment, composite correction gains can be calculated on all regions (x, y) in an image. Consequently, robustness of correction gains can be increased, and shading correction with a higher degree of precision can be performed.

Third Embodiment

Next, a third embodiment of the present invention will be described.

A configuration of an image processing device according to the third embodiment is the same as that in the first embodiment (see FIG. 1), and detailed operations executed by components in an image acquiring unit 11 and an image processing unit 12 are different from those in the first embodiment.

Figure 18:
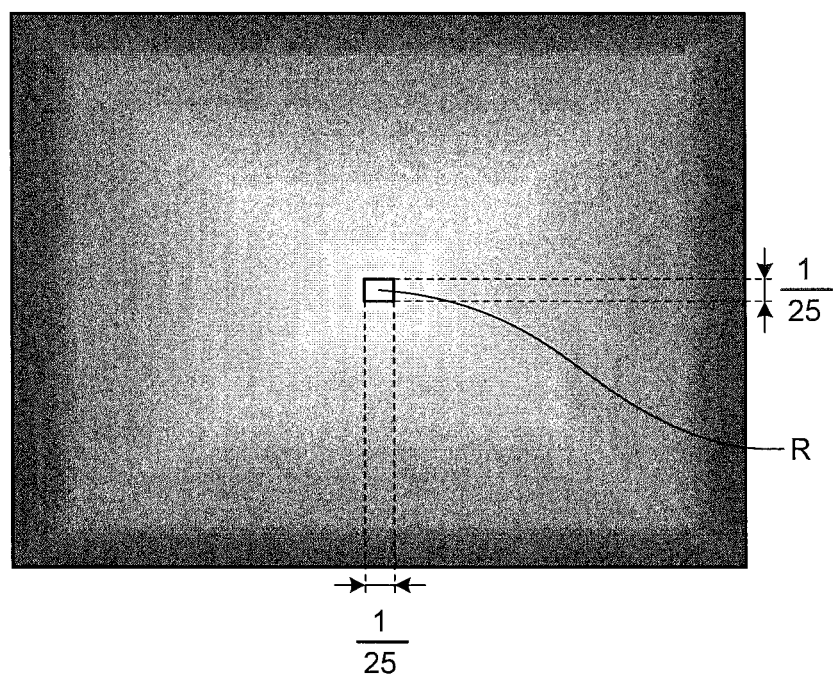
FIG. 18 is a schematic diagram illustrating an example of a case where a reference region is small relative to the entire imaging field of view.

In the first and second embodiments, all images required for calculating correction gains on all regions in an image are acquired by performing imaging while moving an imaging field of view V based on the size of a common region R. However, when the size of a common region R is small relative to an image, the number of images to be acquired increases, increasing the total imaging time. For example, as shown in FIG. 18, when the length of one side of a common region R relative to the length of one side of an image is (1/N)=(1/25), at least {3(N+1)/2}=39 images are required.

Thus, in the third embodiment, as described below, by performing shading correction in two stages, the number of images required (i.e. the number of times of imaging) is reduced, and the imaging time is reduced. Hereinafter, the length of a horizontal side of an imaging field of view V is $L_A$, and the length of a vertical side is $L_B$.

Figure 19:
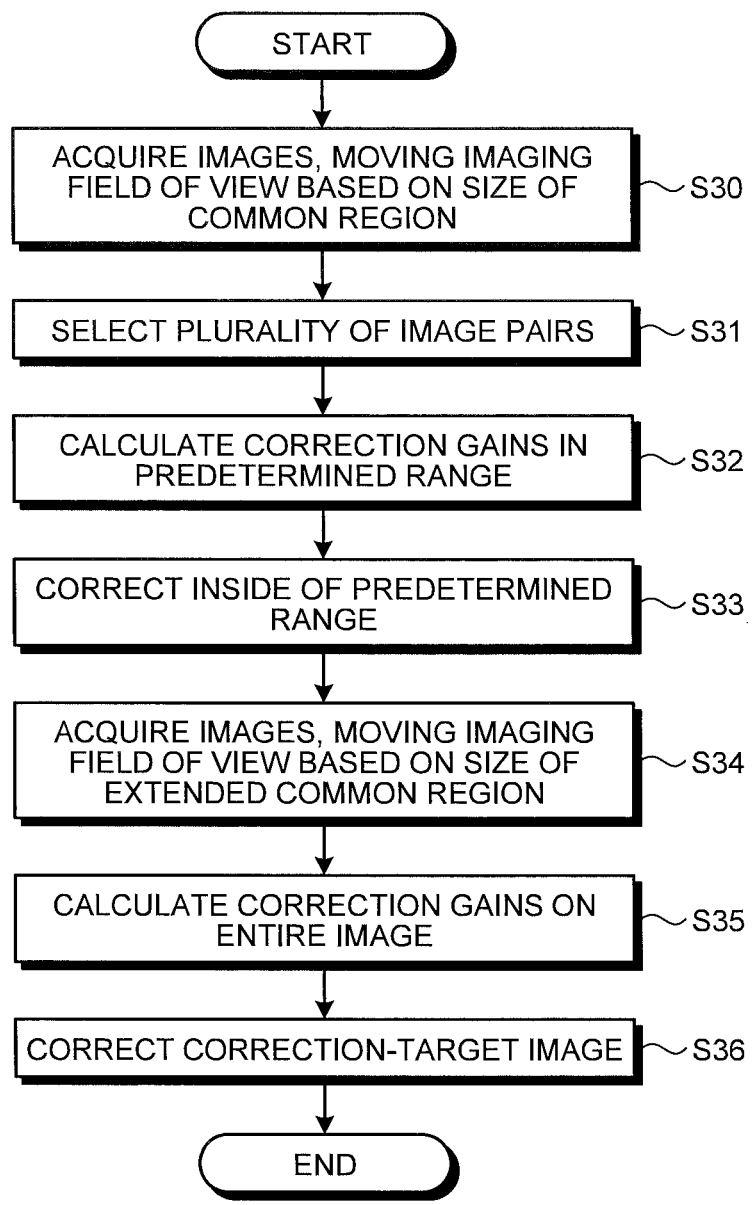
FIG. 19 is a flowchart illustrating an operation of an image processing device according to a third embodiment of the present invention.
Figure 20:
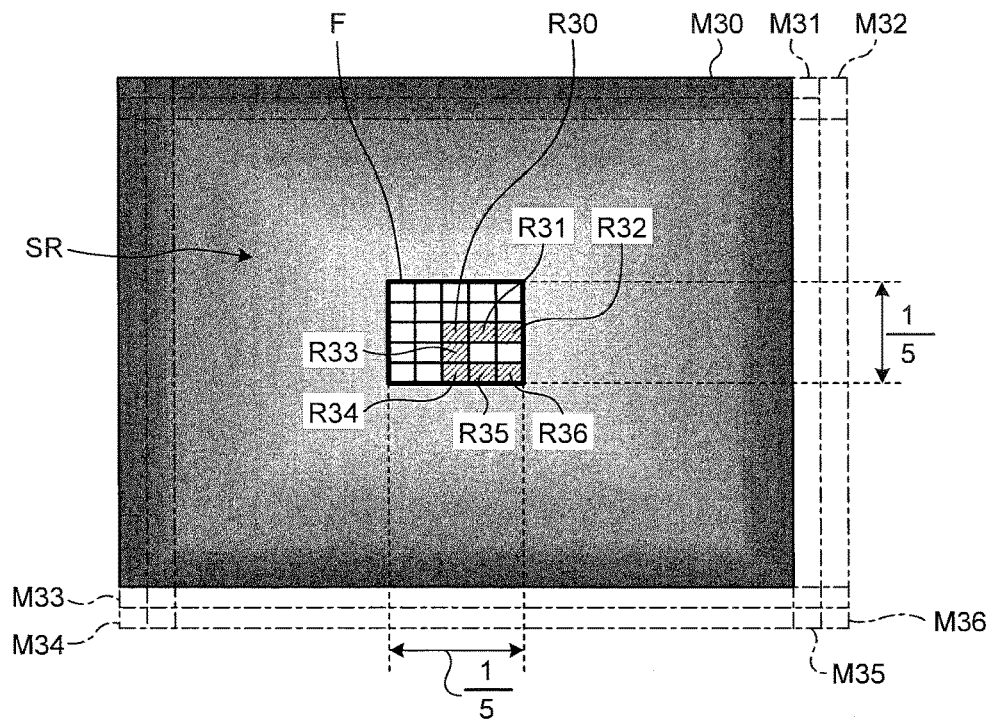
FIG. 20 is a schematic diagram illustrating an image processing method according to the third embodiment of the present invention.

FIG. 19 is a flowchart illustrating an operation of the image processing device according to the third embodiment. First, in step S30, the image acquiring unit 11 acquires a required number of images for calculation of correction gains in a predetermine range around the common region R by performing imaging while moving the imaging field of view V based on the size of the common region R. For example, as shown in FIG. 20, when the length of each side of the common region R (see FIG. 18) is ⅕ of the entire image, and correction gains in a predetermine range F to which the common region R is enlarged five times in a horizontal direction and in a vertical direction are calculated, by performing imaging while moving the imaging field of view V by $L_A/25$ in a horizontal direction or by $L_B/25$ in a vertical direction at a time, seven images M30 to M36 are acquired. In FIG. 20, as in the first embodiment, the imaging field of view V is moved in a C-shaped pattern, but may be moved in a T-shaped pattern as in the first modification. Common regions R30 to R36 illustrated in FIG. 20 are associated with the images M30 to M36.

In subsequent step S31, an image selector 121 selects, from the plurality of images M30 to M36 acquired in step S30, image pairs in which a subject image in the common regions R30 to R36 in one image corresponds to a subject image in regions other than the common regions R30 to R36 in another image. Details of an image pair selection method are the same as those in the first embodiment (see step S11 in FIG. 2).

In subsequent step S32, a correction gain calculating unit 122 calculates a correction gain in each region in the predetermined range F, using the plurality of image pairs selected in step S31. The correction gain in each region in the predetermined range F can be calculated by the same method as that in the first embodiment by replacing the predetermined ranges F in the images M30 to M36 with the images M0 to M6 in the first embodiment (see FIGS. 5 to 8).

Figure 21:
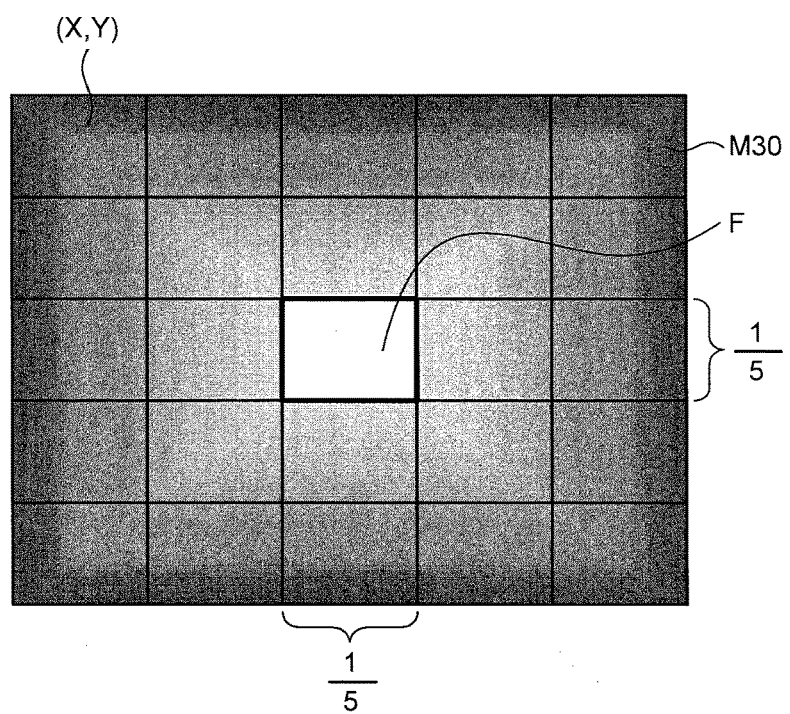
FIG. 21 is a schematic diagram illustrating the image processing method according to the third embodiment of the present invention.

In subsequent step S33, an image correcting unit 123 corrects the predetermined range F in an image acquired by the image acquiring unit 11 (e.g. the image M30), using the correction gains calculated in step S32. Consequently, as shown in FIG. 21, a region where shading does not occur in the image M30 is extended to 25 times the common region R. Hereinafter, this predetermined range F is referred to as an extended common region F.

Figure 22:
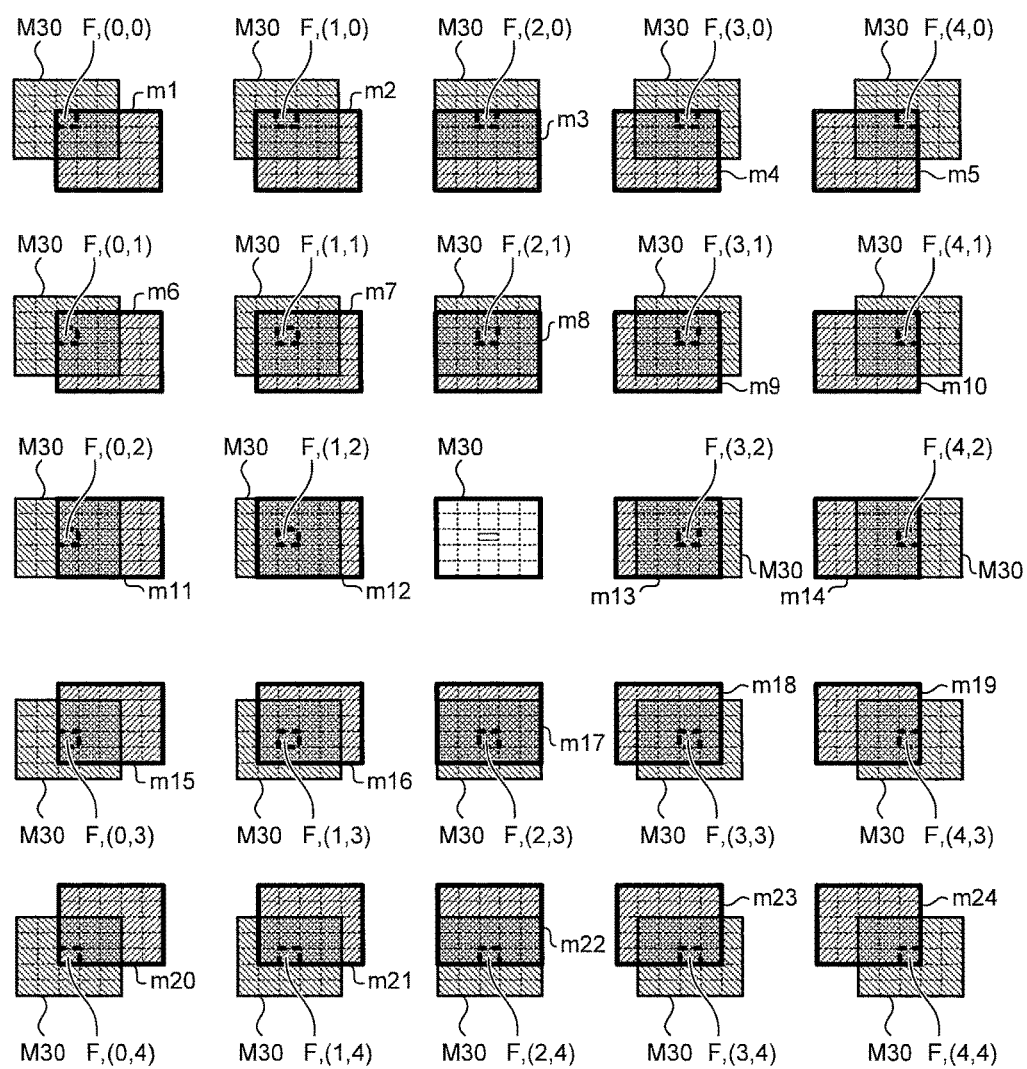
FIG. 22 is a schematic diagram illustrating the image processing method according to the third embodiment of the present invention.

In subsequent step S34, the image acquiring unit 11 performs imaging while moving the imaging field of view V based on the size of the extended common region F, thereby acquiring a plurality of images. For example, as shown in FIG. 21, when the length of one side of the extended common region F is ⅕ the length of one side of the image M30 (i.e. the imaging field of view V), the image acquiring unit 11 performs imaging while moving the imaging field of view V by $L_A/5$ in a horizontal direction or by $L_B/5$ in a vertical direction at a time. Specifically, as shown in FIG. 22, imaging is sequentially performed so that a subject image in a region (X, Y) ($0 \leq X < 5$, $0 \leq Y < 5$) in each image corresponds to a subject image in the extended common region F in the image M30, to acquire images m1 to m24.

In subsequent step S35, the correction gain calculating unit 122 calculates correction gains on the entire image, using the image corrected in step S33 and the images acquired in step S34, to create a gain map. That is, by comparing the extended common region F in the image M30 to regions (X, Y) in the images m1 to m24 of the same subject image as that in the common region F, a correction gain on each region (X, Y) is calculated.

In subsequent step S36, the image correcting unit 123 performs correction by applying the gain map created in step S35 to a correction-target image acquired by the image acquiring unit 11. Consequently, a shading-suppressed corrected image is acquired.

Thereafter, the operation of the image processing device is complete.

As described above, according to the third embodiment, even when a common region R is small relative to an image, the required number of images acquired for calculation of correction gains on the entire image can be reduced. For example, in the case of the above-described example, it is only necessary to acquire total thirty-one images of seven images to be used for calculation of correction gains in a predetermined range F and twenty-four images to be used for calculation of correction gains on the entire image. Therefore, according to the third embodiment, high-precision shading correction can be performed on the entire image while reducing the total time required for imaging.

When correction gains in a predetermined range F are calculated (see step S32), composite correction gains may be calculated as in the second embodiment. In this case, although the number of times of imaging is slightly increased, correction gains can be increased in robustness to perform shading correction with a higher degree of precision.

Fourth Embodiment

Next, a fourth embodiment of the present invention will be described.

Figure 23:
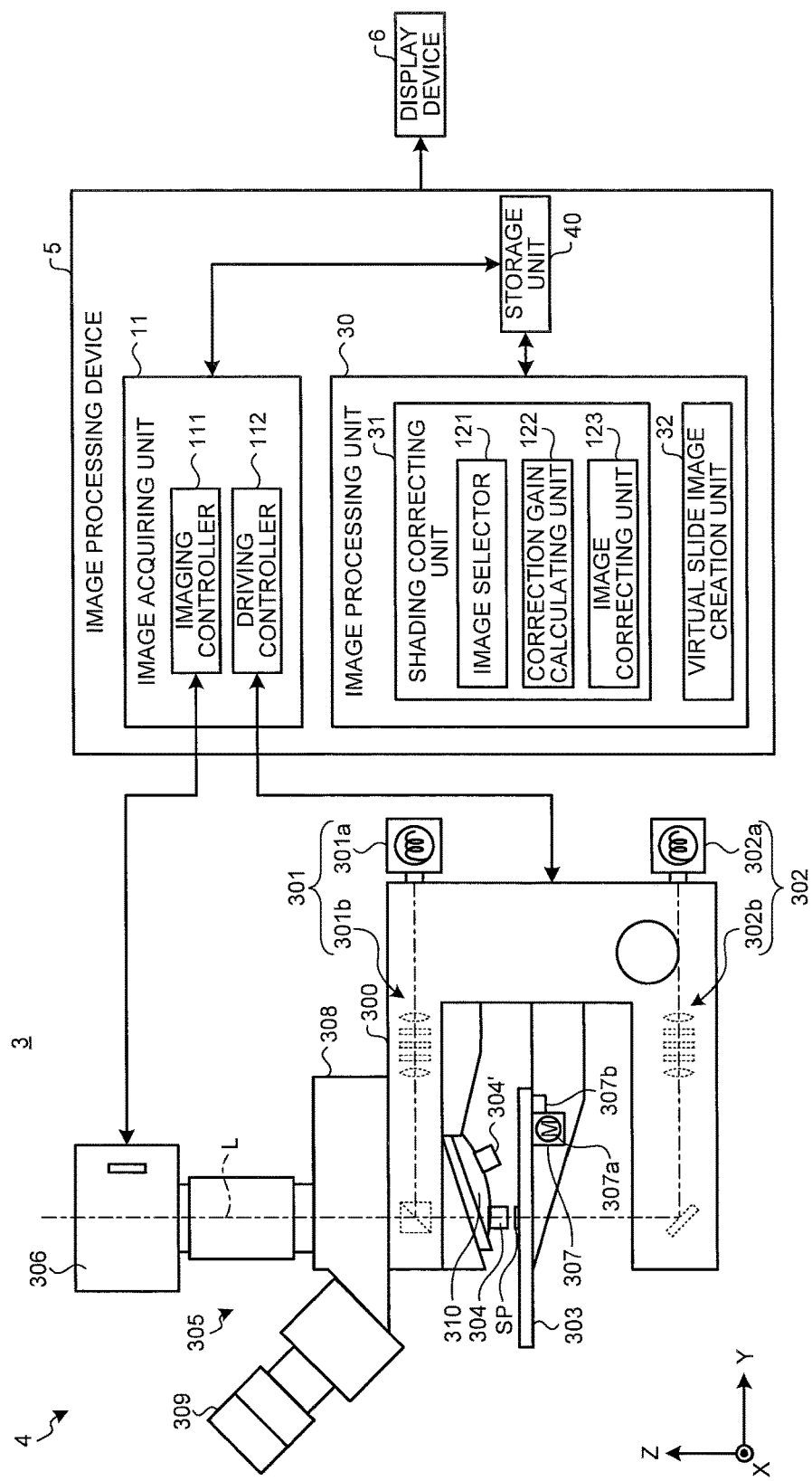
FIG. 23 is a diagram illustrating a configuration of a microscope system according to a fourth embodiment of the present invention.

FIG. 23 is a diagram illustrating a configuration of a microscope system according to the fourth embodiment of the present invention. As shown in FIG. 23, a microscope system 3 according to the fourth embodiment includes a microscope apparatus 4, an image processing device 5, and a display device 6.

The microscope apparatus 4 includes a substantially C-shaped arm 300 provided with a epi-illumination unit 301 and a transmitted-light illumination unit 302, a specimen stage 303 mounted to the arm 300, on which a specimen SP to be observed is placed, an objective lens 304 provided at one end of a lens barrel 305 via a trinocular lens barrel unit 308 to face the specimen stage 303, an imaging unit 306 provided at the other end of the lens barrel 305, and a stage position change unit 307 to move the specimen stage 303. The trinocular lens barrel unit 308 braches observation light of the specimen SP entering from the objective lens 304 to the imaging unit 306 and an eyepiece unit 309 described below. The eyepiece unit 309 is for a user to directly observe the specimen SP.

The epi-illumination unit 301 includes an epi-illumination light source 301a and an epi-illumination optical system 301b, and emits epi-illumination light to the specimen SP. The epi-illumination optical system 301b includes various optical members (such as a filter unit, a shutter, a field stop, and an aperture stop) to collect illumination light emitted from the epi-illumination light source 301a and guide it toward an observation light path L.

The transmitted-light illumination unit 302 includes a transmitted-light illumination light source 302a and a transmitted-light illumination optical system 302b, and emits transmitted-light illumination light to the specimen SP. The transmitted-light illumination optical system 302b includes various optical members (such as a filter unit, a shutter, a field stop, and an aperture stop) to collect illumination light emitted from the transmitted-light illumination light source 302a and guide it toward the observation light path L.

The objective lens 304 is attached to a revolver 310 that can hold a plurality of objective lenses of different magnifications (e.g. objective lenses 304 and 304'). The imaging magnification can be changed by rotating the revolver 310 to change the objective lenses 304 and 304' to face the specimen stage 303.

Inside the lens barrel 305, a zoom unit including a plurality of zoom lenses and a driving unit to change the positions of the zoom lenses (none of them shown) is provided. The zoom unit enlarges or reduces a subject image in an imaging field of view by adjusting the positions of the zoom lenses. An encoder may be further provided to the driving unit in the lens barrel 305. In this case, an output value of the encoder may be output to the image processing device 5 so that the image processing device 5 detects the positions of the zoom lenses from the output value of the encoder to automatically calculate the imaging magnification.

The imaging unit 306 is a camera including an imaging element such as a CCD or a CMOS, for example, and capable of taking color images that have a pixel level (pixel value) in each band of red (R), green (G), and blue (B) in each pixel included in the imaging element, and operates at a predetermined timing, according to control of an imaging controller 111 of the image processing device 5. The imaging unit 306 receives light (observation light) entering from the objective lens 304 through an optical system in the lens barrel 305, generates image data corresponding to the observation light, and outputs it to the image processing device 5. Alternatively, the imaging unit 306 may convert pixel values represented by RGB color spaces into pixel values represented by YCbCr color spaces, and output them to the image processing device 5.

The stage position change unit 307 includes a motor 307a, for example, and changes an imaging field of view by moving the position of the specimen stage 303 in an XY plane. The stage position change unit 307 also focuses the objective lens 304 on the specimen SP by moving the specimen stage 303 along a Z axis.

The stage position change unit 307 is also provided with a position detector 307b that detects the position of the specimen stage 303 and outputs a detection signal to the image processing device 5. The position detector 307b is formed by an encoder to detect the amount of rotation of the motor 307a, for example. Alternatively, the stage position change unit 307 may be formed by a pulse generation unit that generates pulses according to control of a driving controller 112 of the image processing device 5 and a stepping motor.

The image processing device 5 includes an image acquiring unit 11, an image processing unit 30, and a storage unit 40. Of them, the configuration and operation of the image acquiring unit 11 is the same as those in the first embodiment.

The image processing unit 30 includes a shading correcting unit 31 that performs shading correction on images acquired by the image acquiring unit 11, and a virtual slide image creation unit 32 that creates a virtual slide image based on a plurality of shading-removed images.

The shading correcting unit 31 has the same configuration as that of the image processing unit 12 in the first embodiment, and performs shading correction using a gain map that is created based on a plurality of images acquired by the image acquiring unit 11, thereby creating a shading-removed corrected image (see FIG. 2). The shading correcting unit 31 may be configured like the image processing unit 21 in the second embodiment. Alternatively, shading correction may be performed in the same method as that in the third embodiment.

The virtual slide image creation unit 32 aligns and joins corrected images created by the shading correcting unit 31 together, thereby creating a virtual slide image.

The storage unit 40 is formed by a recording device such as semiconductor memory including flash memory, RAM, and ROM capable of update recording, or a recording device built in or connected by a data communication terminal, including a recording medium such as a hard disk, an MO, a CD-R, or a DVD-R and a write/read device that performs write and read of information to and from the recording medium, or the like. The storage unit 40 stores image data on images subjected to image processing by the image processing unit 30, a gain map created by the correction gain calculating unit 122, and the like.

In the fourth embodiment, the image acquiring unit 11 and the image processing unit 30 may be formed by dedicated hardware, or may be formed by reading a predetermined program in hardware such as a CPU. In the latter case, the storage unit 40 further stores a control program to cause the image acquiring unit 11 to execute control of an imaging operation over the microscope apparatus 4, an image processing program to cause the image processing unit 30 to execute image processing including shading correction, and various parameters and setting information used during execution of these programs.

The display device 6 is formed by a display device such as an LCD, an EL display, or a CRT display, for example, and displays images and related information output from the image processing device 5.

Figure 24:
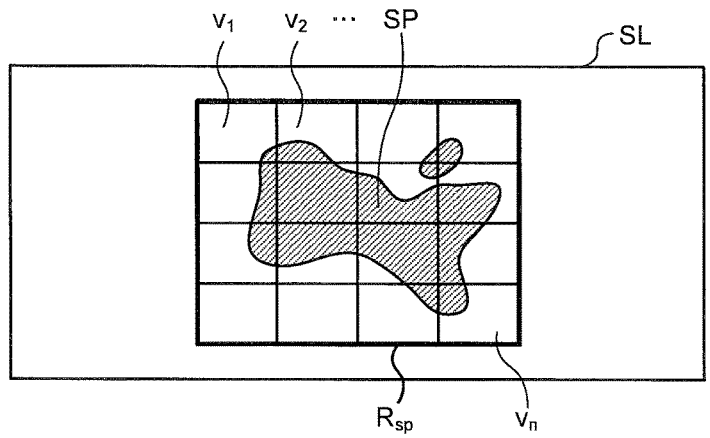
FIG. 24 is a schematic diagram illustrating a sample to be observed in the microscope system illustrated in FIG. 23.

Next, an operation of the microscope system 3 will be described. FIG. 24 is a schematic diagram illustrating the specimen SP under magnification. As shown in FIG. 24, the specimen SP is generally fixed in a predetermined range (specimen region $R_{SP}$) on a slide glass SL, and set on the specimen stage 303.

Figure 25:
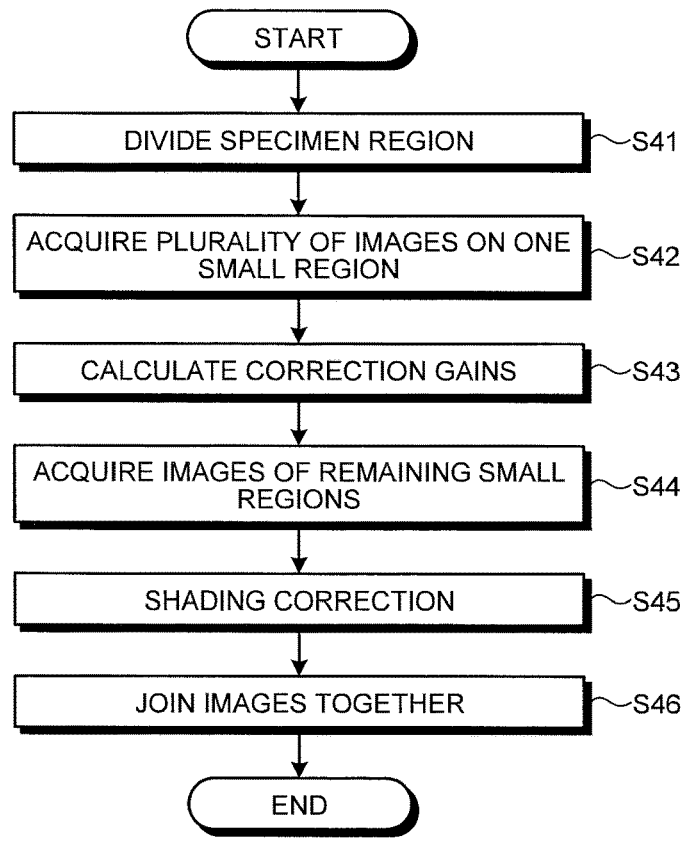
FIG. 25 is a flowchart illustrating an operation of the microscope system illustrated in FIG. 23.

FIG. 25 is a flowchart illustrating an operation of the microscope system 3. First, in step S41, the imaging controller 111 divides the specimen region $R_{SP}$ into a plurality of small regions $v_1$ to $v_n$, depending on the imaging magnification of the objective lens 304. The number of divisions n of the specimen region $R_{SP}$ at this time is set so that the size of the small regions $v_1$ to $v_n$ is equal to the imaging field of view V (see FIG. 3) determined by the imaging magnification, or the small regions $v_1$ to $v_n$ are slightly smaller than the imaging field of view V. In FIG. 24, the specimen region $R_{SP}$ is divided into n=16, as an example.

Next, in step S42, the microscope apparatus 4 performs imaging on one of the small regions $v_1$ to $v_n$ (e.g. the small region $v_1$) while moving the imaging field of view V under the control of the imaging controller 111 and the driving controller 112, thereby acquiring a plurality of images (see FIGS. 3 and 4). A subject region SR illustrated in FIGS. 3 and 4 corresponds to the small region $v_1$ in the fourth embodiment. The plurality of images acquired by the microscope apparatus 4 is sequentially captured into the image processing device 5.

In step S43, the shading correcting unit 31 calculates correction gains based on the plurality of images captured into the image acquiring unit 11 to create a gain map. A method of calculating correction gains is the same as that in the first embodiment. At this time, the shading correcting unit 31 may perform shading correction on an image of the small region $v_1$, using the created gain map.

In step S44, the microscope apparatus 4 performs imaging sequentially, aligning the imaging field of view V with the remaining small regions $v_2$ to $v_n$ under the control of the imaging controller 111 and the driving controller 112, thereby acquiring images of the small regions $v_2$ to $v_n$. When the size of the small regions $v_2$ to $v_n$ is set slightly smaller than the imaging field of view V, images of adjacent small regions overlap at edge portions. Images acquired by the microscope apparatus 4 are sequentially captured into the image processing device 5.

In step S45, the shading correcting unit 31 performs shading correction on the images of the small regions $v_1$ to $v_n$ using the gain map created in step S43. As a result, shading-removed corrected images of the small regions $v_1$ to $v_n$ are acquired.

In step S46, the virtual slide image creation unit 32 aligns and joins the corrected images of the small regions $v_1$ to $v_n$ together, thereby creating an image (virtual slide image) of the entire specimen region $R_{SP}$. At this time, alignment may be performed with overlapping portions between images of adjacent small regions as indices.

Thereafter, the operation of the microscope system 3 is complete.

As described above, according to the fourth embodiment, by joining shading-removed images of the small regions $v_1$ to $v_n$ together, a high-precision good-quality virtual slide image of the entire specimen region $R_{SP}$ can be acquired. Further, according to the fourth embodiment, with the specimen SP to be observed placed on the specimen stage 303, images to be used for calculation of correction gains and images for virtual slide image creation can be acquired continuously. Therefore, the need for a troublesome operation such as interchanging of calibration samples for correction gain calculation is eliminated, and a higher-precision virtual slide image can be acquired in a shorter time than before.

According to some embodiments, a plurality of images of different imaging fields of view is acquired, and a correction gain for performing shading correction is calculated, based on a combination of images among the plurality of images, in which a subject image in a common region in one image corresponds to a subject image in a region other than a common region in another image, so that shading correction can be performed in a short time and with a high degree of precision.

The present invention is not limited to the above-described first to fourth embodiments and modifications as they are. Various inventions can be formed by appropriately combining a plurality of components disclosed in the first to fourth embodiments and the modifications. For example, some components can be omitted from all the components illustrated in the first to fourth embodiments and the modifications for formation. Alternatively, components illustrated in different embodiments may be combined as appropriate for formation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
a processor comprising hardware, wherein the processor is configured to:
  acquire a plurality of images of different imaging fields of view on the same subject;
  select, from the plurality of images acquired, in which a common region of a predetermined size is set at a common position in the individual images, a plurality of image pairs that are combinations of images in which a subject image in the common region in one image corresponds to a subject image in a region other than the common region in another image;
  calculate a correction gain for performing shading correction, based on a pixel value of a pixel contained in the common region and a pixel value of a pixel contained in a region corresponding to the common region, for each combination of the one image and the another image; and
  correct shading produced in a correction-target image, using the correction gain calculated,
wherein the common region is a central region when each image included in the plurality of images is divided by the same odd number not less than three in each of a first direction and a second direction orthogonal to the first direction, and
wherein when the number of divisions in each of the first and second directions is N, the length of the imaging field of view in the first direction is $L_A$, and the length of the imaging field of view in the second direction is $L_B$, the processor is configured to acquire the plurality of images by:
  controlling an image sensor to perform imaging $\{(N-1)/2+1\}$ times while controlling an actuator to move the imaging field of view by the length of $L_A/N$ at a time in the first direction;
  controlling the image sensor to perform imaging $(N-1)/2$ times while controlling the actuator to move the imaging field of view by the length of $L_B/N$ at a time in the second direction from one end of an imaged region; and
  further controlling the image sensor to perform imaging $(N-1)/2$ times while controlling the actuator to move the imaging field of view by the length of $L_A/N$ at a time in the first direction from another end of an imaged region.

2. The image processing device according to claim 1, wherein the processor is configured to:
  control a storage to sequentially store the correction gain calculated; and
  calculate a composite correction gain using a plurality of correction gains calculated on the same region in the image.

3. A microscope system comprising:
the image processing device according to claim 1;
a light source configured to illuminate the subject;
the image sensor;
the actuator; and
an optical system configured to guide transmitted light or reflected light from the subject to the image sensor.

4. The image processing device according to claim 1, wherein the number of divisions in each of the first and second directions is set based on a region in each of the images where a brightness attenuation rate relative to the center of the image is less than or equal to a predetermined value.

5. The image processing device according to claim 1, wherein when the number of divisions in each of the first and second directions is N, the processor is configured to:
control the image sensor to acquire at least $(3N-1)/2$ images; and
select at least $(N^2-1)/2$ image pairs.

6. An image processing device comprising:
a processor comprising hardware, wherein the processor is configured to:
acquire a plurality of images of different imaging fields of view on the same subject;
select, from the plurality of images acquired, in which a common region of a predetermined size is set at a common position in the individual images, a plurality of image pairs that are combinations of images in which a subject image in the common region in one image corresponds to a subject image in a region other than the common region in another image;
calculate a correction gain for performing shading correction, based on a pixel value of a pixel contained in the common region and a pixel value of a pixel contained in a region corresponding to the common region, for each combination of the one image and the another image; and
correct shading produced in a correction-target image, using the correction gain calculated,
wherein the common region is a central region when each image included in the plurality of images is divided by the same odd number not less than three in each of a first direction and a second direction orthogonal to the first direction, and
wherein when the number of divisions in each of the first and second directions is N, the length of a side of the imaging field of view in the first direction is $L_A$, and the length of a side of the imaging field of view in the second direction is $L_B$, the processor is configured to acquire the plurality of images acquired by:
controlling an image sensor to perform imaging N times while controlling an actuator to move the imaging field of view by a length of $L_A/N$ at a time in the first direction; and
with an imaging position at the $(N+1)/2$nd time in the first direction as a starting point, controlling the image sensor to perform imaging $(N-1)/2$ times while controlling the actuator to move the imaging field of view by the length of $L_B/N$ at a time in the second direction.

7. The image processing device according to claim 6, wherein the number of divisions in each of the first and second directions is set based on a region in each of the images where a brightness attenuation rate relative to the center of the image is less than or equal to a predetermined value.

8. The image processing device according to claim 6, wherein when the number of divisions in each of the first and second directions is N, the processor is configured to:
control the image sensor to acquire at least $(3N-1)/2$ images; and
select at least $(N^2-1)/2$ image pairs.

9. The image processing device according to claim 6, wherein the processor is configured to:
control a storage to sequentially store the correction gain calculated; and
calculate a composite correction gain using a plurality of correction gains calculated on the same region in the image.

10. A microscope system comprising:
the image processing device according to claim 6;
a light source configured to illuminate the subject;
the image sensor;
the actuator; and
an optical system configured to guide transmitted light or reflected light from the subject to the image sensor.

11. An image processing method comprising:
acquiring a plurality of images of different imaging fields of view on the same subject;
selecting, from the plurality of images acquired, in which a common region of a predetermined size is set at a common position in the individual images, a plurality of image pairs that are combinations of images in which a subject image in the common region in one image corresponds to a subject image in a region other than the common region in another image;
calculating a correction gain for performing shading correction, based on a pixel value of a pixel contained in the common region and a pixel value of a pixel contained in a region corresponding to the common region, for each combination of the one image and the another image; and
correcting shading produced in a correction-target image, using the correction gain calculated,
wherein the common region is a central region when each image included in the plurality of images is divided by the same odd number not less than three in each of a first direction and a second direction orthogonal to the first direction, and
wherein when the number of divisions in each of the first and second directions is N, the length of the imaging field of view in the first direction is $L_A$, and the length of the imaging field of view in the second direction is $L_B$, acquiring the plurality of images comprises:
controlling an image sensor to perform imaging $\{(N-1)/2+1\}$ times while controlling an actuator to move the imaging field of view by the length of $L_A/N$ at a time in the first direction;
controlling the image sensor to perform imaging $(N-1)/2$ times while controlling the actuator to move the imaging field of view by the length of $L_B/N$ at a time in the second direction from one end of an imaged region; and
further controlling the image sensor to perform imaging $(N-)/2$ times while controlling the actuator to move the imaging field of view by the length of $L_A/N$ at a time in the first direction from another end of an imaged region.

12. A non-transitory computer-readable recording medium recording an image processing program for causing a computer to at least:
acquire a plurality of images of different imaging fields of view on the same subject;
select, from the plurality of images acquired, in which a common region of a predetermined size is set at a common position in the individual images, a plurality of image pairs that are combinations of images in which a subject image in the common region in one image corresponds to a subject image in a region other than the common region in another image;
calculate a correction gain for performing shading correction, based on a pixel value of a pixel contained in the common region and a pixel value of a pixel contained in a region corresponding to the common region, for each combination of the one image and the another image; and
correct shading produced in a correction-target image, using the correction gain calculated,
wherein the common region is a central region when each image included in the plurality of images is divided by the same odd number not less than three in each of a first direction and a second direction orthogonal to the first direction, and
wherein when the number of divisions in each of the first and second directions is N, the length of the imaging field of view in the first direction is $L_A$, and the length of the imaging field of view in the second direction is $L_B$, the plurality of images are acquired by the image processing program causing the computer to at least:
control an image sensor to perform imaging $\{(N-1)/2+1\}$ times while controlling an actuator to move the imaging field of view by the length of $L_A/N$ at a time in the first direction;
control the image sensor to perform imaging $(N-1)/2$ times while controlling the actuator to move the imaging field of view by the length of $L_B/N$ at a time in the second direction from one end of an imaged region; and
further control the image sensor to perform imaging $(N-1)/2$ times while controlling the actuator to move the imaging field of view by the length of $L_A/N$ at a time in the first direction from another end of an imaged region.

13. An image processing method comprising:
acquiring a plurality of images of different imaging fields of view on the same subject;
selecting, from the plurality of images acquired, in which a common region of a predetermined size is set at a common position in the individual images, a plurality of image pairs that are combinations of images in which a subject image in the common region in one image corresponds to a subject image in a region other than the common region in another image;
calculating a correction gain for performing shading correction, based on a pixel value of a pixel contained in the common region and a pixel value of a pixel contained in a region corresponding to the common region, for each combination of the one image and the another image; and
correcting shading produced in a correction-target image, using the correction gain calculated,
wherein the common region is a central region when each image included in the plurality of images is divided by the same odd number not less than three in each of a first direction and a second direction orthogonal to the first direction, and
wherein when the number of divisions in each of the first and second directions is N, the length of a side of the imaging field of view in the first direction is $L_A$, and the length of a side of the imaging field of view in the second direction is $L_B$, acquiring the plurality of images comprises:
controlling an image sensor to perform imaging N times while controlling an actuator to move the imaging field of view by a length of $L_A/N$ at a time in the first direction; and
with an imaging position at the $(N+1)/2$nd time in the first direction as a starting point, controlling the image sensor to perform imaging $(N-1)/2$ times while controlling the actuator to move the imaging field of view by the length of $L_B/N$ at a time in the second direction.

14. A non-transitory computer-readable recording medium recording an image processing program for causing a computer to at least:
acquire a plurality of images of different imaging fields of view on the same subject;
select, from the plurality of images acquired, in which a common region of a predetermined size is set at a common position in the individual images, a plurality of image pairs that are combinations of images in which a subject image in the common region in one image corresponds to a subject image in a region other than the common region in another image;
calculate a correction gain for performing shading correction, based on a pixel value of a pixel contained in the common region and a pixel value of a pixel contained in a region corresponding to the common region, for each combination of the one image and the another image; and
correct shading produced in a correction-target image, using the correction gain calculated,
wherein the common region is a central region when each image included in the plurality of images is divided by the same odd number not less than three in each of a first direction and a second direction orthogonal to the first direction, and
wherein when the number of divisions in each of the first and second directions is N, the length of a side of the imaging field of view in the first direction is $L_A$, and the length of a side of the imaging field of view in the second direction is $L_B$, the plurality of images are acquired by the image processing program causing the computer to at least:
control an image sensor to perform imaging N times while controlling an actuator to move the imaging field of view by a length of $L_A/N$ at a time in the first direction; and
with an imaging position at the $(N+1)/2$nd time in the first direction as a starting point, control the image sensor to perform imaging $(N-1)/2$ times while controlling the actuator to move the imaging field of view by the length of $L_B/N$ at a time in the second direction.

* * * * *